United States Patent [19]
Uehara et al.

[11] Patent Number: 5,754,798
[45] Date of Patent: May 19, 1998

[54] COMPUTER SYSTEM WITH FUNCTION FOR CONTROLLING SYSTEM CONFIGURATION AND POWER SUPPLY STATUS DATA

[75] Inventors: Keiichi Uehara; Tadaaki Inomata, both of Tokyo, Japan

[73] Assignee: Kabushiki Kaisha Toshiba, Kawasaki, Japan

[21] Appl. No.: 291,942

[22] Filed: Aug. 17, 1994

[30]  Foreign Application Priority Data

Feb. 18, 1994 [JP] Japan .................................. 6-020978
May 25, 1994 [JP] Japan .................................. 6-110985

[51] Int. Cl.$^6$ ................................................. G06F 13/10
[52] U.S. Cl. ..................... 395/284; 395/653; 395/750.03
[58] Field of Search ........................... 395/750, 284, 395/700, 159, 188.01, 750.03, 348, 651, 652, 653

[56]  References Cited

U.S. PATENT DOCUMENTS

| | | | |
|---|---|---|---|
| 4,268,901 | 5/1981 | Subrizi et al. | 395/284 |
| 4,739,310 | 4/1988 | Yamamoto . | |
| 5,241,646 | 8/1993 | Arai . | |
| 5,336,950 | 8/1994 | Popli et al. | 326/39 |
| 5,432,941 | 7/1995 | Crick et al. | 395/700 |
| 5,446,904 | 8/1995 | Belt et al. | 395/750 |
| 5,452,401 | 9/1995 | Lin | 395/750 |
| 5,497,455 | 3/1996 | Suga et al. | 395/159 |
| 5,537,544 | 7/1996 | Morisawa et al. | 395/188.01 |

OTHER PUBLICATIONS

Toshiba Reference Manual for T2000SXe Portable Personal Computer, pp. I–v, Mar. 26–Mar. 31 (1991).

Microsoft Press Computer Dictionary Nov. 1993, pp. 18, 23, 63, 179, 275, 82, 95, 350, 358 & 380.

*Primary Examiner*—Jack B. Harvey
*Assistant Examiner*—Paul R. Myers
*Attorney, Agent, or Firm*—Finnegan, Henderson, Farabow, Garrett & Dunner, L.L.P.

[57] ABSTRACT

Since an instruction of switching of the system operation environment or configuration such as the power save mode and power-up mode is input by the hot key operation using SMI, key data of the hot key can be instantly received by the CPU even while any type of application program is being executed, and the operation environment is changed. Further, when the system operation environment or configuration such as the power save mode and power-up mode is changed, a pop-up window indicating the present system operation environment is automatically opened on the display image plane according to the rewritten operation environment or system configuration data of the CMOS memory. Therefore, the operation mode switched by the hot key function can be instantly indicated to the user. When an event mode is set, in response to a change of a power supply status, a power supply controller set data indicating the changing of the power supply status, into a predetermined register of the computer system. At this time, the power supply controller informs the CPU of the changing of the power supply status by using an interrupt signal.

24 Claims, 13 Drawing Sheets

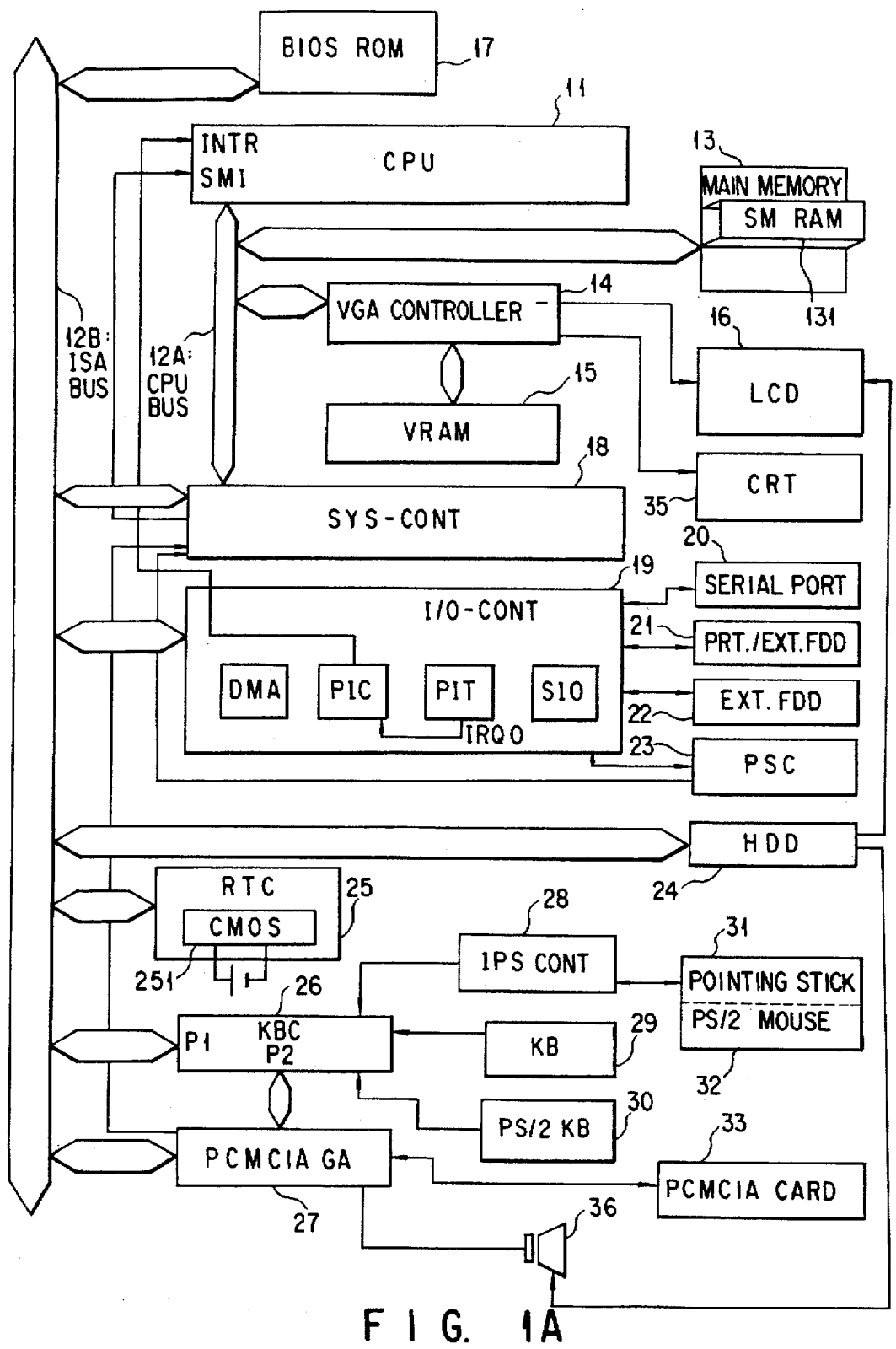
F I G. 1A

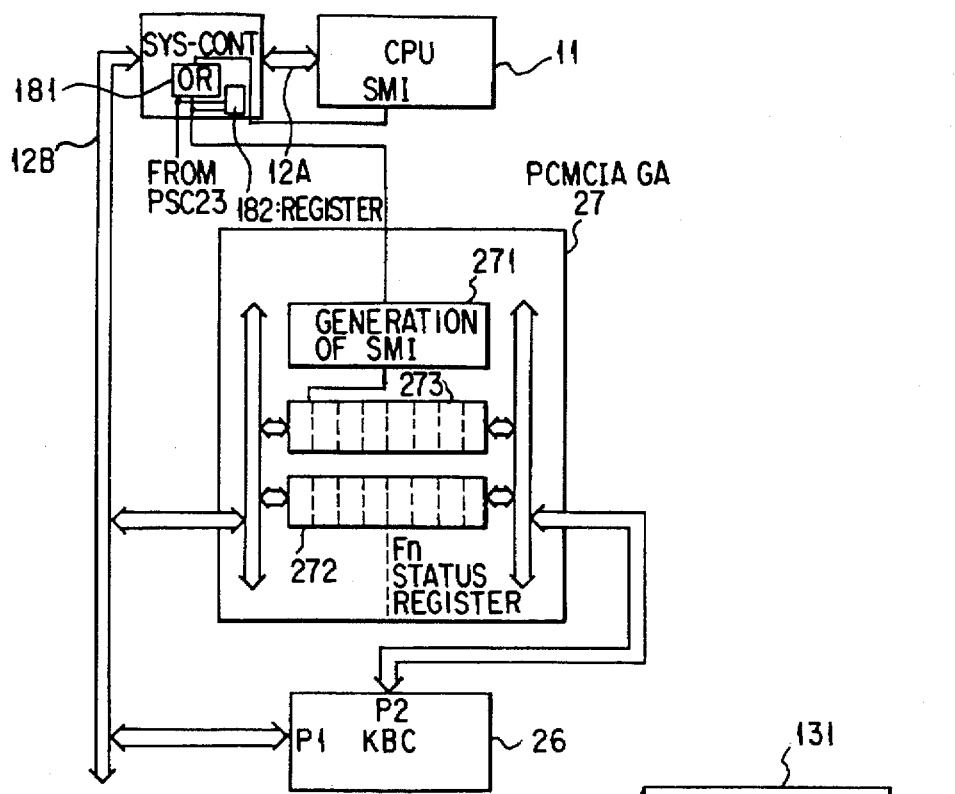
F I G. 2
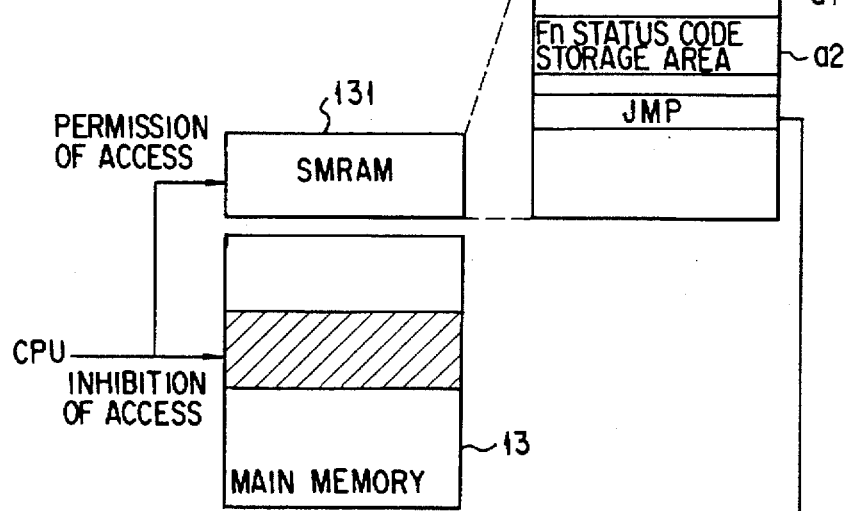
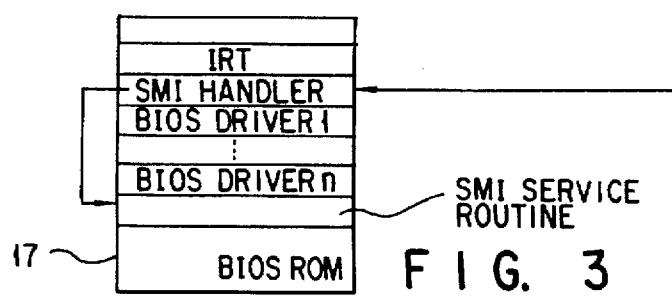
F I G. 3

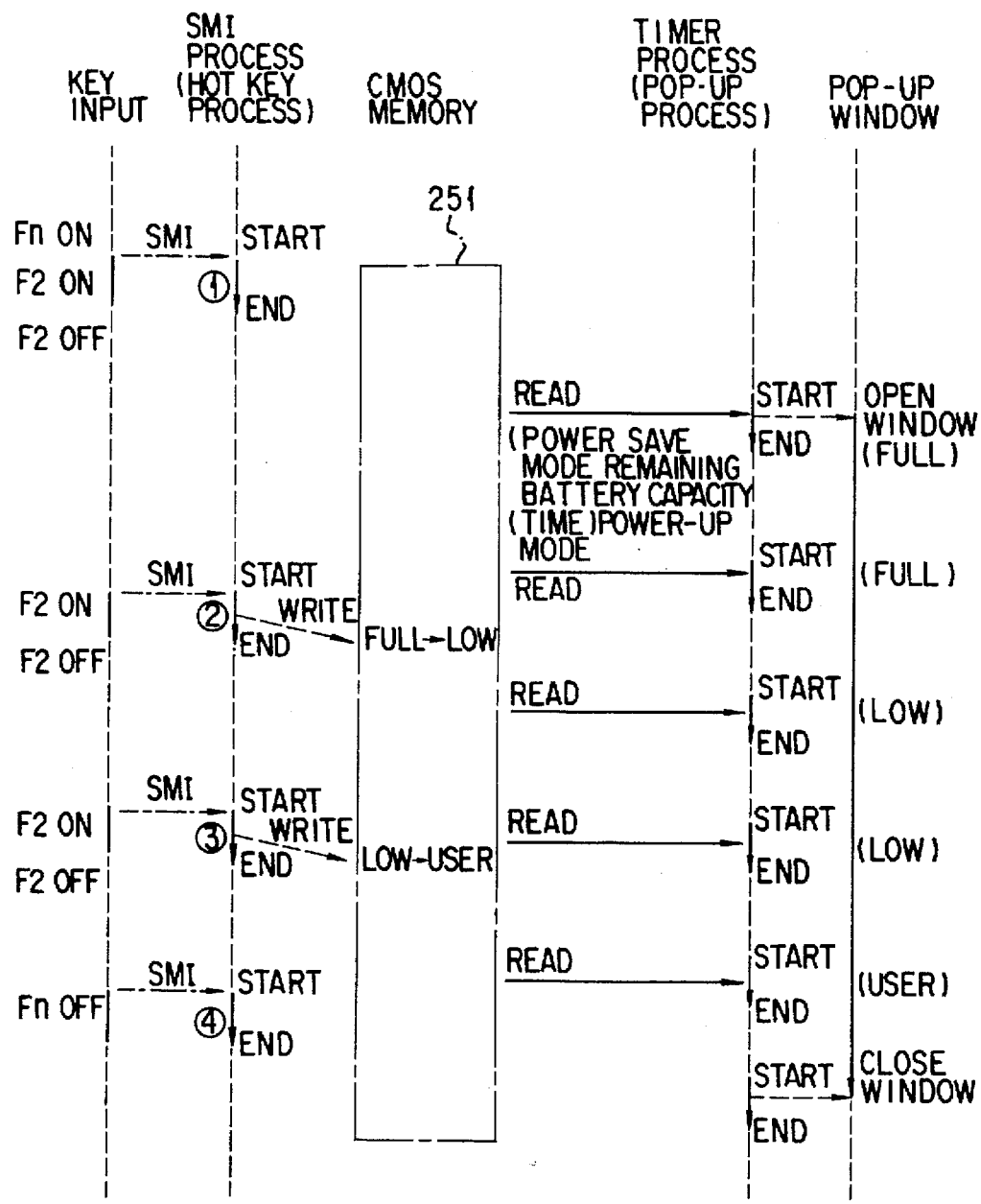
F I G. 6

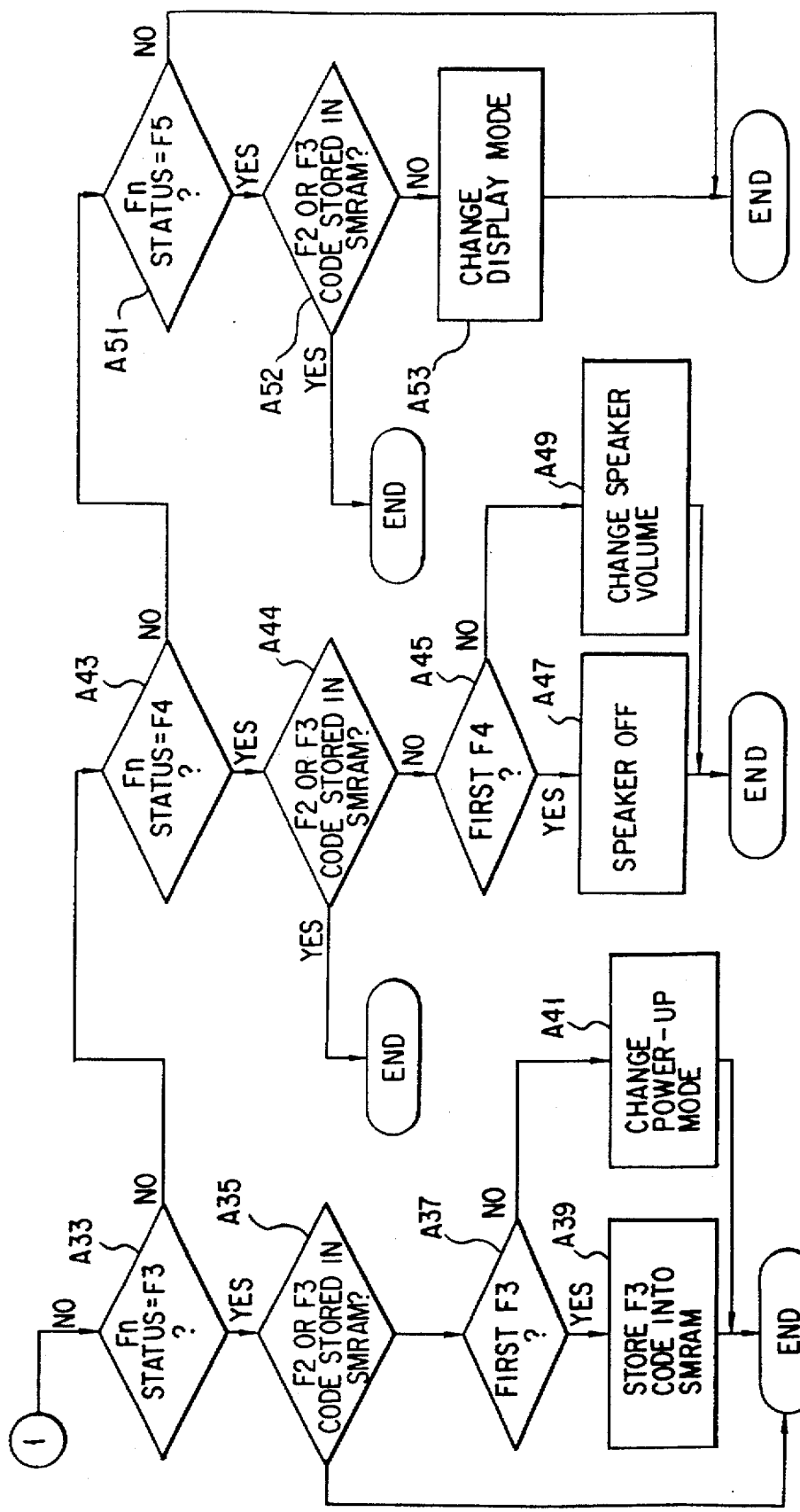
F I G. 7B

CMOS MEMORY

| IDX # | USE |
|---|---|
| 70 | POWER SUPPLY STATUS 1<br>BIT.0 = RECEIVED LOW BATTERY POWER OFF (LB1)<br>BIT.1 = RECEIVED MAIN SW POWER OFF<br>BIT.2 = RECEIVED PANEL CLOSE POWER OFF<br>BIT.3 = RECEIVED ACK TO CMD (91)<br>BIT.4 = (RECEIVED SPEAKER VOLUM CONTROL)<br>BIT.5-6 = RESERVED (0)<br>BIT.7 = RECEIVED ACK |
| 71 | POWER SUPPLY STATUS 2<br>BIT.0 = AC ADAPTER<br>BIT.1 = 1ST LOW BATTERY LBO<br>BIT.2 = 2ND LOW BATTERY LBO<br>BIT.3-7 = RESERVED (0) |
| 72 | 1ST BATTERY CAPACITY |
| 73 | 1ST BATTERY TIME VALUE |
| 74 | 2ND BATTERY CAPACITY |
| 75 | 2ND BATTERY TIME VALUE |
| 76 | TEMPORARY SAVING FOR BATTERY CAPACITY HIGH |
| 77~7F | |

F I G. 10

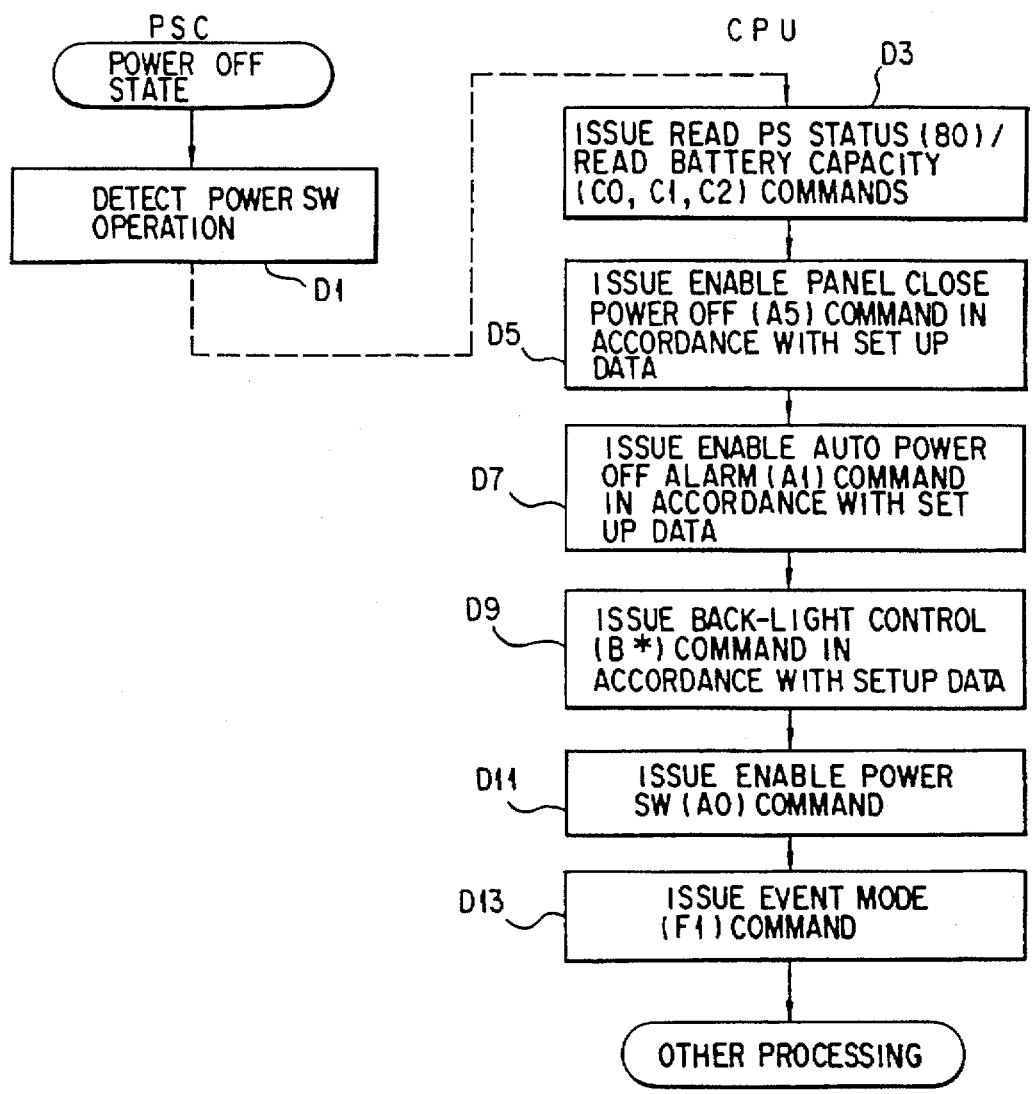
F I G. 12

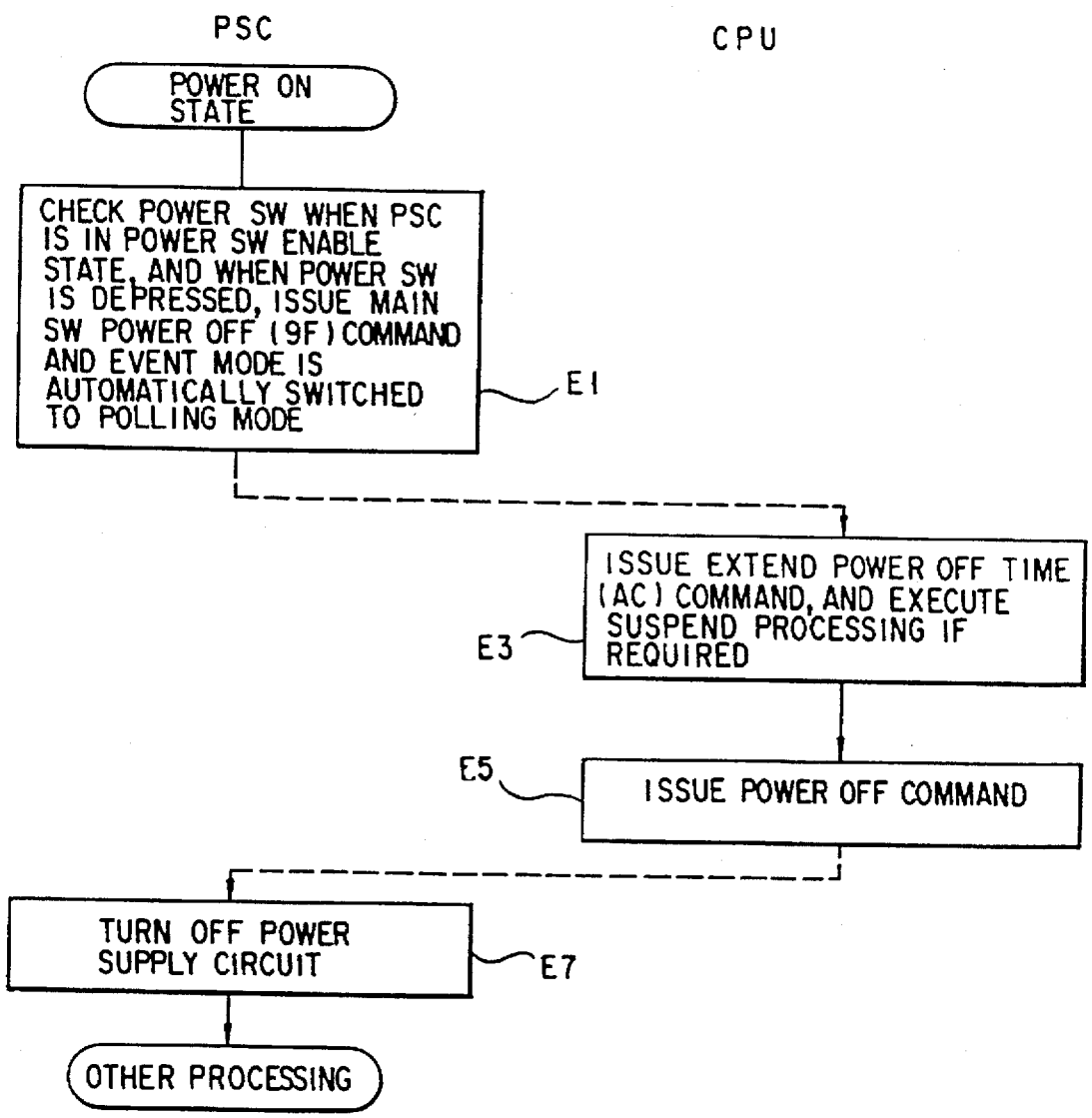
F I G. 13

COMPUTER SYSTEM WITH FUNCTION FOR CONTROLLING SYSTEM CONFIGURATION AND POWER SUPPLY STATUS DATA

BACKGROUND OF THE INVENTION

1. Field of the Invention

This invention relates to a computer system of lap-top type or notebook type, and, more particularly, to a computer system having a function to directly change operation environment or system configuration data of the computer system in response to a depression of a predetermined plurality of keys.

Further, the present invention relates to a computer system in which a power supply controller communicates with and informs a central processing unit (CPU) of a power supply status, such as battery information.

2. Description of the Related Art

In recent years, various types of personal portable computers of lap-top type or notebook type have been developed.

This type of portable computer has various operation modes such as a resume mode and a boot mode and the operation modes can be selectively set by rewriting operation environment or system configuration data set in a CMOS memory in the system. Conventionally, rewriting of the operation environment or system configuration data is generally effected by use of a pop-up window.

The pop-up window is a window provided by the pop-up processing program for operation mode setting and is displayed to partly overlap an image provided by the application program now executed. Several items indicating the operation modes to be selectively set are defined in the pop-up window and a desired one of the operation modes can be specified by selecting one of the items by use of a cursor or the like. The operation environment or system configuration data in the CMOS memory is rewritten according to the operation mode specified by the pop-up window, and the operation mode of the system is changed from the resume mode to the boot mode, for example.

However, since the pop-up processing program is started by use of a maskable key-input interrupt, the interrupt will be masked in some application program which is now executed and the pop-up process cannot be effected.

In this case, the operation mode cannot be changed until execution of the application program is completed.

Therefore, in recent years, portable computers in which the operation mode can be changed by use of a hot key are developed.

Since the hot key utilizes a non-maskable interrupt signal, the operation mode can be instantly changed by rewriting status information according to key data of the hot key even while any type of application program is being executed.

However, in the system using the hot key, any image display such as the pop-up window for indicating the operation mode is not effected. For this reason, it is necessary to provide a display lamp or display unit exclusively used for status display or the like on the computer body in order to confirm the present operation mode selectively set by the hot key, and as a result, the number of parts used is increased and the manufacturing cost rises.

Particularly, in recent years, sub-note type portable computers which are smaller than the conventional portable computer and are excellent in the portability are developed, and in such a sub-note type portable computer, it is extremely difficult to provide a space for mounting the display lamp or display unit exclusively used for status display as described before.

In the conventional portable computer having the hot key function, the system operation environment or configuration such as the operation mode can be changed irrespective of the software environment, but it is necessary to provide the display lamp or display unit exclusively used for status display or the like on the computer body in order to confirm the system operation environment or configuration changed by the hot key function. As a result, the number of parts used is increased and the manufacturing cost rises.

Portable computers of this type are designed to be drivable on battery power, so that they employ various power managements for extending the battery-based operation time and present ways of displaying the remaining battery capacity. Such managements of the power supply are executed based on the power supply status, such as the remaining battery capacity or the connection to an AC adapter.

The CPU establishes communication with the power supply controller to receive such information on the power supply. Conventionally, this communication is executed through a polling system, so that the CPU should sequentially issue a status read command to the power supply controller in order to receive the necessary information from this controller. This requires a relative long time for the communication between the CPU and the power supply controller.

For example, data transfer from one of the CPU and the power supply controller to the other requires 10 milliseconds. Normally, therefore, about 60 milliseconds are needed from one command transfer to the power supply controller from the CPU to the next command transfer. Further, the communication between the CPU and the power supply controller may be executed in the sequence of command transfer to the power supply controller from the CPU, ACK transfer to the CPU from the power supply controller and then status transfer to the CPU from the power supply controller.

When a relatively small number of information exchanges between the CPU and power supply controller are involved, therefore, no problems would arise. When the number of the information exchanges increases, however, the communication during this period monopolizes most of the time of the CPU, thus lowering the overall processing performance of the computer system.

As the types of the power supply statuses increase, the number of communications between the CPU and power supply controller increases. If the types of the power supply statuses increase to extend the power management function of the system, the number of communications between the CPU and power supply controller increases accordingly, reducing the system performance. In a pop-up process or a process in APM (Advanced Power Management), for example, the number of communications between the CPU and power supply controller increases accordingly, reducing the system performance as mentioned above.

According to the conventional portable computers, the transfer of a power supply status to the CPU from the power supply controller is executed in a polling system in which the CPU issues a command to the power supply controller. This system increases the number of data exchanges between the CPU and power supply controller, reducing the system performance. Even if the power supply status has not changed at all, the CPU should wastefully communicate with the power supply controller. Further, extending the power management function inevitably increases the types of the power supply statuses that should be transferred to the CPU from the power supply controller. This may raise a problem on the execution of an application program for the power management.

SUMMARY OF THE INVENTION

An object of this invention is to provide a computer system capable of indicating the system operation environment such as the operation mode changed by the hot key function to the user without providing a display lamp or display unit exclusively used for status display on the computer body.

It is a second object of the present invention to provide a portable computer which can efficiently transfer a power supply status to a CPU from a power supply controller.

According to a first aspect of the present invention, there is provided a computer system comprising: a memory storing configuration data for setting a system configuration of the computer system; key input means for inputting a predetermined key code for specifying change of the system configuration; means for updating the configuration data according to the predetermined key code to change the system configuration in response to the input of the predetermined key code from the key input means; a display device; window display means for reading out the configuration data from the memory in response to the change of the system configuration by the predetermined key code and opening a window for indicating the system configuration specified by the configuration data on the display device; and means for changing the system configuration according to the updated configuration data in response to the input of the predetermined key code.

According to a second aspect of the present invention, there is provided a computer system comprising: a memory storing configuration data for setting a system configuration of the computer system; key input means having a plurality of keys at least one of which is assigned as a predetermined key for specifying change of the system configuration, for inputting make and break codes corresponding to the predetermined key in response to the turn-ON and turn-OFF of the predetermined key, respectively; means for updating the configuration data according to the make code of the predetermined key to change the system configuration in response to the input of the make code of the predetermined key from the key input means; a display device; window display means for reading out the configuration data from the memory in response to the input of the make code from the key input means, for opening a window for indicating the system configuration according to the configuration data on the display device, for repeatedly and periodically effecting the readout of the configuration data the window display based on the configuration data in a period from input of the make code to input of the break code to indicate the system configuration set before and after the change by the window display, and for closing the window in response to the input of the break code; and means for changing the system configuration according to the updated configuration data in response to the input of the make code.

According to a third aspect of the present invention, there is provided a computer system comprising: a memory storing configuration data for setting a system configuration of the computer system; a display device; key input means having a plurality of keys at least one of which is assigned as a predetermined key for specifying change of the system configuration, for inputting make and break codes corresponding to the predetermined key in response to the turn-ON and turn-OFF of the predetermined key, respectively; key code holding means in which the make code or break code of the predetermined key input from the key input means is set; system management interrupt generation means for generating a system management interrupt signal when the make code of the predetermined key is set in the key code holding means; timer interrupt means for periodically generating a timer interrupt signal; and a CPU (central processing unit) having a system management mode in which a system management program for updating the configuration data according to the make code of the predetermined key is executed, for interrupting a program being executed and switching the operation mode into the system management mode in response to the system management interrupt signal, and in the system management mode, for opening a window for indicating the system configuration specified by the configuration data of the memory on the display device in response to the timer interrupt signal when the make code of the predetermined key is set in the key code holding means, for closing the window when the break code of the predetermined key is set in the key code holding means, and for returning to execute the interrupted program after the window is opened or closed.

According to a fourth aspect of the present invention, there is provided, in a computer system including a memory storing configuration data for setting a system configuration of the computer system, a keyboard, and a display device, a method for displaying the configuration data comprising the steps of: a) inputting a predetermined key code through the keyboard for specifying change of the system configuration; b) updating the configuration data stored in the memory according to the predetermined key code in response to the input of the predetermined key code by step a); c) changing the system configuration according to the updated configuration data in response to the input of the predetermined key code; and d) reading out the configuration data from the memory in response to the change of the system configuration and opening a window for indicating the system configuration specified by the configuration data on the display device.

According to a fifth aspect of the present invention, there is provided, in a computer system including a memory storing configuration data for setting a system configuration of the computer system, a keyboard having a plurality of keys at least one of which is assigned as a predetermined key for specifying change of the system configuration, and a display device, a method for displaying the configuration data comprising the steps of: a) inputting make and break codes corresponding to the predetermined key in response to the turn-ON and turn-OFF of the predetermined key, respectively; b) updating the configuration data stored in the memory according to the make code of the predetermined key in response to the input of the make code of the predetermined key by the step a); c) reading out the configuration data form the memory in response to the input of the make code from the keyboard and opening a window for indicating the system configuration according to the configuration data on the display device; d) repeatedly and periodically effecting the step c) in a period from input of the make code to input of the break code to indicate the system configuration set before and after the change; and e) closing the window in response to the input of the break code.

In the above computer system, since an instruction of switching of the system operation environment or configuration is input by the hot key, key data of the hot key can be instantly received and change of the system operation environment or configuration can be effected even while any type of application program is being executed. Further, when the system operation environment or configuration is changed, the window which indicates the present system operation environment or configuration is opened on the display image plane according to the rewritten operation environment or system configuration data. Therefore, it becomes possible to instantly indicate the operation mode or the like changed by the hot key function to the user without providing a display lamp or display unit exclusively used for status display on the computer body.

Further, this invention utilizes different interrupt processing functions for the hot key function and window display function such that the hot key function can be realized by a system management interrupt and the window display function can be realized by a timer interrupt.

The system management interrupt is a non-maskable interrupt signal for permitting the system management mode of a CPU to be utilized, and a function for saving the CPU status at the time of generation of the system management interrupt, restoring the CPU status at the time of completion of the interrupt process and recovering the status which was set before generation of the interrupt is provided. By use of the system management interrupt, key data of the hot key can be received and the operation environment or system configuration data can be changed without giving any influence on the application program which is now executed.

Further, only the process of changing the operation environment or system configuration data is effected in the system management mode and the window display is effected in the timer process. Thus, for example, even if the hot key is depressed during the execution of a communication program, execution of the communication program is interrupted for only an extremely short period of time until the operation environment or system configuration data is changed. Therefore, a problem that a communication error may be caused by a long period of interrupt of execution of the communication program will not occur.

Further, the timer process is repeatedly effected at regular periods, but only the checking process of key code holding means by which a hot key is set and the opening/closing process for the window are effected in one cycle of the timer process. In this case, if the hot key is set in the ON state, the window is opened and the timer process is completed with the window kept open. If the hot key is changed from the ON state to the OFF state, the window which is made open is closed and then the timer process is terminated. Therefore, the window is kept displayed in a period in which the hot key is depressed, but the problem that the CPU is exclusively used by the timer process in the above period can be prevented. Thus, the communication program will not be interrupted for a long period of time.

According to a sixth aspect of the present invention, there is provided a computer system having a CPU, various input/output units and a power supply controller for controlling power supply to the units, comprising: a register, provided between the CPU and the power supply controller, for temporarily registering various kinds of data to be exchanged between the CPU and the power supply controller; and means for supplying an interrupt signal to the CPU when data from the power supply controller is set in the register, thereby informing the CPU of the data being set in the register; the power supply controller including, event generation detecting means for monitoring various power supply statuses concerning power management of the computer system and detecting a change in any power supply status, and means for setting data indicating the power supply status, whose change is detected by the event generation detecting means, in the register, whereby every time a power supply status changes, the CPU is informed of data indicating the changed power supply status by the interrupt signal.

According to this system, therefore, every time a change in power supply status occurs, the CPU is informed of the changed power supply status by an interrupt signal. Unlike the conventional polling type communication, therefore, the CPU need not issue a command to the power supply controller. It is thus possible to efficiently transfer the power supply status to the CPU from the power supply controller.

It is preferable that system management interrupt (SMI) be used as an interrupt signal to the CPU. The system management interrupt is an interrupt signal that enables the utilization of the system management function of the CPU. The system management interrupt serves to save the CPU status upon occurrence of the system management interrupt, restore the CPU status to return to what has been before the interrupt occurred, when the interrupt process is terminated. The use of this system management interrupt allows the CPU to efficiently receive the power supply status from the power supply controller without affecting an application program that is currently running.

According to a seventh aspect of the present invention, there is provided a computer system having a CPU, various input/output units and a power supply controller for controlling power supply to the units, comprising: a register, provided between the CPU and the power supply controller, for temporarily registering various kinds of data to be exchanged between the CPU and the power supply controller; means for supplying a system management interrupt signal to the CPU when data from the power supply controller is set in the register, thereby informing the CPU of the data being set in the register; a main memory for storing a program to be executed by the CPU; and an overlay memory for storing a command to call an interruption program for receiving and processing data from the power supply controller, the overlay memory being mapped in part of an address space of the main memory; the CPU having a program execution mode for executing a program in the main memory and a system management mode for calling and executing the interruption program, and having means for saving a CPU status in the program execution mode and then switching the program execution mode to the system management mode in response to the system management interrupt signal, and returning the CPU status and returning the system management mode to the program execution mode in response to termination of execution of the interruption program, the power supply controller including, event generation detecting means for monitoring various power supply statuses concerning power management of the computer system and detecting a change in any power supply status, and means for setting data indicating the power supply status, whose change is detected by the event generation detecting means, in the register, whereby every time a power supply status changes, the CPU is informed of data indicating the changed power supply status by the interrupt signal.

According to a eighth aspect of the present invention, there is provided a computer system having a CPU, various input/output units and a power supply controller for controlling power supply to the units, comprising: a register, provided between the CPU and the power supply controller, for temporarily registering various kinds of data to be exchanged between the CPU and the power supply controller; and means for supplying an interrupt signal to the CPU when data from the power supply controller is set in the register, thereby informing the CPU of the data being set in the register; the power supply controller including, mode setting means for setting an operation mode of the power supply controller to one of a polling mode and an event mode in accordance with a mode setting request from the CPU or a result of detection of a predetermined power supply status, means for setting a power supply status concerning power control of the computer system in the register in response to a status read request supplied via the register from the CPU in polling mode, and means for monitoring various power supply statuses concerning power management of the computer system and setting data indicating any power supply status, whose change is detected, in the register upon detection of the change in event mode.

According to a ninth aspect of the present invention, there is provided a computer system having a CPU, various input/output units and a power supply controller for controlling power supply to the units, the power supply controller comprising: event generation detecting means for monitoring various power supply statuses concerning power management of the computer system and detecting a change in any power supply status; and means for setting data indicating the power supply status, whose change is detected by the event generation detecting means, in predetermined registers readable by the CPU.

According to a tenth aspect of the present invention, there is provided in a computer system having a CPU, various input/output units, a power supply circuit for supplying power to the units, and a register provided between the CPU and the power supply circuit, a method for managing various power supply statuses comprising the steps of: a) monitoring the various power supply statuses concerning the power supply circuit of the computer system and detecting a change in any power supply status; b) setting data indicating the power supply status, whose change is detected by the step a), in the register; and c) supplying an interrupt signal to the CPU when data is set in the register, thereby informing the CPU of the data being set in the register.

In this system, the power supply controller has two operation modes: the aforementioned event mode and the same polling mode as used in the prior art. The operation modes can be changed in a programmable manner. When the CPU is executing an uninterruptable program, such as an application program for fast communication, therefore, the mode of the power supply controller can be switched to the polling mode from the event mode so that a problem, such as the occurrence of a timeout error in the application program due to an interrupt from the power supply controller, can be prevented.

If the power supply controller is set to the event mode immediately after the system is powered on or immediately before the system is powered off, the power-on sequence or the power-off sequence may undesirably be interrupted by an interrupt from the power supply controller. It is thus desirable that the power supply controller be set to the polling mode immediately after the system is powered on or immediately before the system is powered off.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A and 1B are block diagrams showing the entire system construction of a personal computer according to one embodiment of this invention;

FIG. 2 is a diagram showing the hardware structure associated with the communication between the CPU of the personal computer of FIGS. 1A and 1B and the keyboard controller thereof;

FIG. 3 is a diagram for illustrating the system management function of the CPU provided in the personal computer of FIGS. 1A and 1B;

FIG. 6 is a diagram showing the relation between the hot key processing routine and the pop-up processing routine when the power save mode is changed in the personal computer of FIGS. 1A and 1B;

FIGS. 7A and 7B are flow charts showing the procedure of the hot key processing routine in the personal computer of FIGS. 1A and 1B;

FIG. 10 is a table showing one example of the power supply status which are stored in CMOS memory in the personal computer of FIG. 1A;

FIG. 12 is a flow chart showing the operation of the personal computer of FIGS. 1A and 1B when the personal computer is powered on; and FIG. 13 is a flow chart showing the operation of the personal computer of FIGS. 1A and 1B when the personal computer is powered off.

DETAILED DESCRIPTION OF THE PREFERRED EMBODIMENTS

Figure 1B:
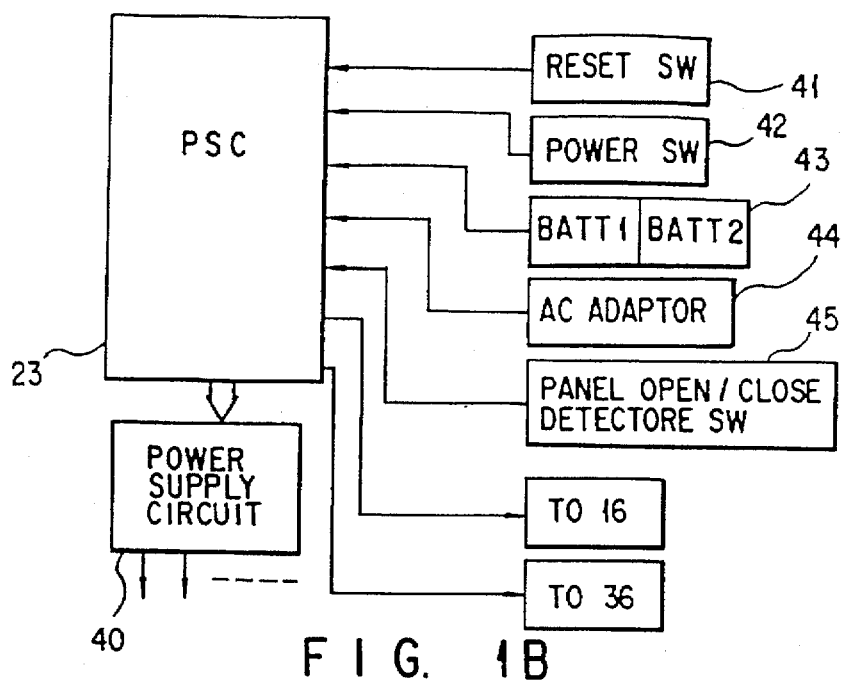

There will now be described an embodiment of this invention with reference to the accompanying drawings. In FIGS. 1A and 1B, the system construction of a portable computer system according to one embodiment of this invention is shown.

The portable computer is a sub-note type personal computer, for example, and as shown in FIGS. 1A and 1B, it has a CPU 11, CPU local bus 12A, system bus 12B of ISA specification, main memory 13, VGA controller 14, VRAM 15, and a flat panel display unit 16 such as LCD.

The CPU 11 effects the control operation for the entire system and executes a to-be-processed program stored in the main memory 13. As the CPU 11, a processor which supports the system management interrupt (SMI: System Management Interrupt) such as a microprocessor SL Enhanced Intel 486 manufactured by and sold from INTEL Co. is used.

When the microprocessor SL Enhanced Intel 486 is used, the CPU 11 has the following system management functions.

That is, the CPU 11 has an operation mode for executing a system management program called a system management mode (SMM: System Management Mode) in addition to a protect mode, imaginary 86 mode, and real mode for executing the application programs and other programs such as OS.

The real mode is a mode capable of accessing the memory space of 1 megabyte at maximum and the physical address is determined by an offset value from the base address expressed by a segment register.

The protect mode is a mode capable of accessing the memory space of 4 gigabytes at maximum for each task and a linear address is determined by use of an address mapping table called a descriptor table. The linear address is finally converted into a physical address by paging.

The imaginary 86 mode is a mode for permitting a program, which is constructed to be operated in the real mode, to be operated in the protect mode, and the program in the real mode is treated as one task in the protect mode.

The system management mode (SMM) is a pseudo real mode, and in this mode, the descriptor table is not referred to and the paging is not effected.

When the system management interrupt (SMI: System Management Interrupt) is issued to the CPU 11, the operation mode of the CPU 11 is switched from the real mode, protect mode or imaginary 86 mode which is the present operation mode to the SMM. When the operation mode is switched to the SMM by the SMI, the CPU 11 saves the CPU status which is the content of the CPU register set at this time into an SMRAM 131. Further, when a return instruction (RSM instruction) is executed in the SMM, the CPU 11 restores the CPU status from the SMRAM 131 to the CPU register and recovers the operation mode which was set before generation of the SMI. In the SMM, the system management program is executed.

The SMI is one type of non-maskable interrupt NMI and is an interrupt of highest priority having higher priority than the normal NMI and maskable interrupt INTR. By issuing the SMI, various service routines prepared as the system management program can be started without being influenced by the application program now executed and OS environment.

In the above system, the SMI is used to effect the process of changing the system operation environment or configuration using the hot key, and to inform to the CPU 11 from the power supply controller 23 of that the power supply status is changed. IF the SMI is used to effect the process of informing, the changing of the power supply status is informed to the CPU 11 using the SMI, whenever the changing of the power supply status is occurred.

The main memory 13 stores operating systems, to-be-processed application programs, user data created by the application programs and the like. The SMRAM (System Management RAM) 131 is an overlay mapped in the address space ranging from the address 30000H to the address 3FFFFH of the main memory 13 and can be accessed only when an SMI signal is input to the CPU 11. In this case, the address range in which the SMRAM 131 is mapped is not fixedly set and can be changed to a desired location of the 4 gigabyte space by a register called an SMBASE. The SMBASE register can be accessed only in the SMM. The default value of the SMBASE register is an address 3000H. Further, in this system, the SMRAM 131 can be mapped in an area ranging from the address 30000H to the address 3FFFFH of the main memory 13 not only by using the SMI but also by setting data into a preset register of the system controller 18.

When the CPU 11 is set into the SMM, the CPU status, that is, the register of the CPU 11 set when the SMI is issued is saved into the SMRAM 131 in the stacked form. In the SMRAM 131, an instruction for reading out the system management program in the BIOS ROM 17 is stored. The instruction is an instruction which is first executed when the CPU 11 is set into the SMM and the controlling process for the system management program is started by execution of the instruction. The system management program includes a hot key processing routine for changing the system operation environment or configuration according to key data of the hot key.

In this case, the hot key is a key for directly requesting the CPU 11 to change various operation modes so as to set/change the system environment and some specified keys on the keyboard 29 are allotted as the hot key. When the hot key is operated, some functions associated with the setting/changing of the system operation environment or configuration provided by the CPU 11 are directly read out and executed. Unlike the normal data transmission case, in the hot key process, an SMI is issued to the CPU 11 and information that the hot key is depressed is given to the CPU 11.

As the operation environment which can be set or changed by the hot key, the instant security function, switching of the power save mode, switching of the resume/boot mode, switching of the display mode, changing of the volume of the speaker and the like may be provided. These functions are provided by the hot key processing routine stored in the BIOS-RAM 17 as will be described later. Since the hot key processing routine is effected by the SMI, it can be instantly read out without being influenced by the OS environment or application program which is now executed and can be executed without terminating execution of the program which is now executed.

The VGA controller 14 controls the display operation of the flat panel display unit 16 constructed by an LCD panel with back light of monochromic gradation display or color display, receives image data from the CPU 11 via a CPU local bus 12A and stores the same into the image memory (VRAM) 15. In this case, since the system bus 12B is not used, the system performance will not be lowered by transfer of the image data. The contrast of the flat panel display unit 16 and the display of reversal of black and white can be adjusted by operation of the hot key on the keyboard 29. Further, the VGA controller 14 has a function of controlling a CRT display unit 35 which can be connected to the computer body if necessary and permits display data to be selectively displayed on one of the flat panel display unit 16 and CRT display unit 35 or permits the same display data to be simultaneously displayed on both of them.

When the setting/changing process of the system operation environment or configuration is effected by use of the hot key, a window (which is hereinafter referred to as a pop-up window) indicating the system operation environment or configuration set at this time is displayed on the flat panel display unit 16. Unlike the window displayed in the conventional pop-up process, the pop-up window is not used for setting/changing the system operation environment or configuration and is used for indicating the system operation environment or configuration set/changed to the user.

To the system bus 12B, the BIOS ROM 17, system controller (SYS-CONT) 18, and I/O controller (I/O-CONT) 19 are connected.

The BIOS ROM 17 is used to store a system BIOS (Basic I/O System) and is constructed by a flash memory so that the program can be rewritten. The system BIOS is constructed so as to be operated in the real mode. In the system BIOS, an IRT routine executed at the time of system boot, a device driver for controlling various I/O devices and a system management program are contained. The system management program is an interrupt program executed in the SMM and contains various SMI service routines including an SMI handler and hot key processing routine. The SMI handler is used to start the SMI service routine according to the cause of generation of SMI, and starts the hot key processing routine when the SMI due to the hot key is generated, and starts an SMI service routine corresponding to the cause of generation of the SMI when the SMI is generated by another factor.

In the timer interrupt processing program contained in the system BIOS, a function of displaying a pop-up window for indicating the system operation environment or configuration changed by the hot key process to the user is contained.

The system controller 18 includes a bridge device for connecting the CPU local bus 12A and the system bus 12B to each other and a memory control logic for controlling the memories in the system. Further, the system controller 18 includes an OR circuit 181 for informing the CPU 11 of the SMI in response to the external SMI generation and a register 182 for storing data which is used so as to determine a factor of the SMI generation. The OR circuit 181 receives a signal indicating the SMI generation from the PCMCIA GA 27 or PSC 23. The CPU 11, in response to the SMI generation, reads the data form the register 182, and determines the factor of the SMI generation in accordance with a predetermined bit of the data. According to the factor, the CPU 11 executes the hot key processing routine or reads the power supply status transferred from the power supply controller 23. That is, the CPU 11 determines whether the SMI is generated in KBC 26 or PSC 23 by referring the data of the register 182.

The I/O controller 19 effects the control operations for controlling the I/O device connected to a serial port 20, controlling the printer/external FDD connected to a parallel port 21, and controlling the external FDD connected to a parallel port 22. The I/O controller 19 contains two DMA controllers for direct memory access control, two interrupt controllers (PIC Programmable Interrupt Controller), two system timers (PIT: Programmable Interval Timer), and two serial I/O controllers (SIO: Serial Input/Output Controller). The system timer (PIT) periodically issues timer interrupts (IRQ0) at preset time intervals. When the timer interrupt (IRQ0) is issued, the interrupt controller (PIC) generates INTR, thereby informing the CPU 11 of generation of the timer interrupt.

The I/O controller 19 further contains an I/O register group used for communication between a power supply controller (PSC) 23 and the CPU 11.

The I/O controller 19 includes a SMI generation circuit 191, a register 192 being used for the communication between the CPU 11 and the power supply controller 23, and a register 193 for storing data indicating the SMI generation. Further, the I/O controller 19 includes a register for storing data indicating an operation status (busy/idle) of the power supply controller 23.

Figure 9:
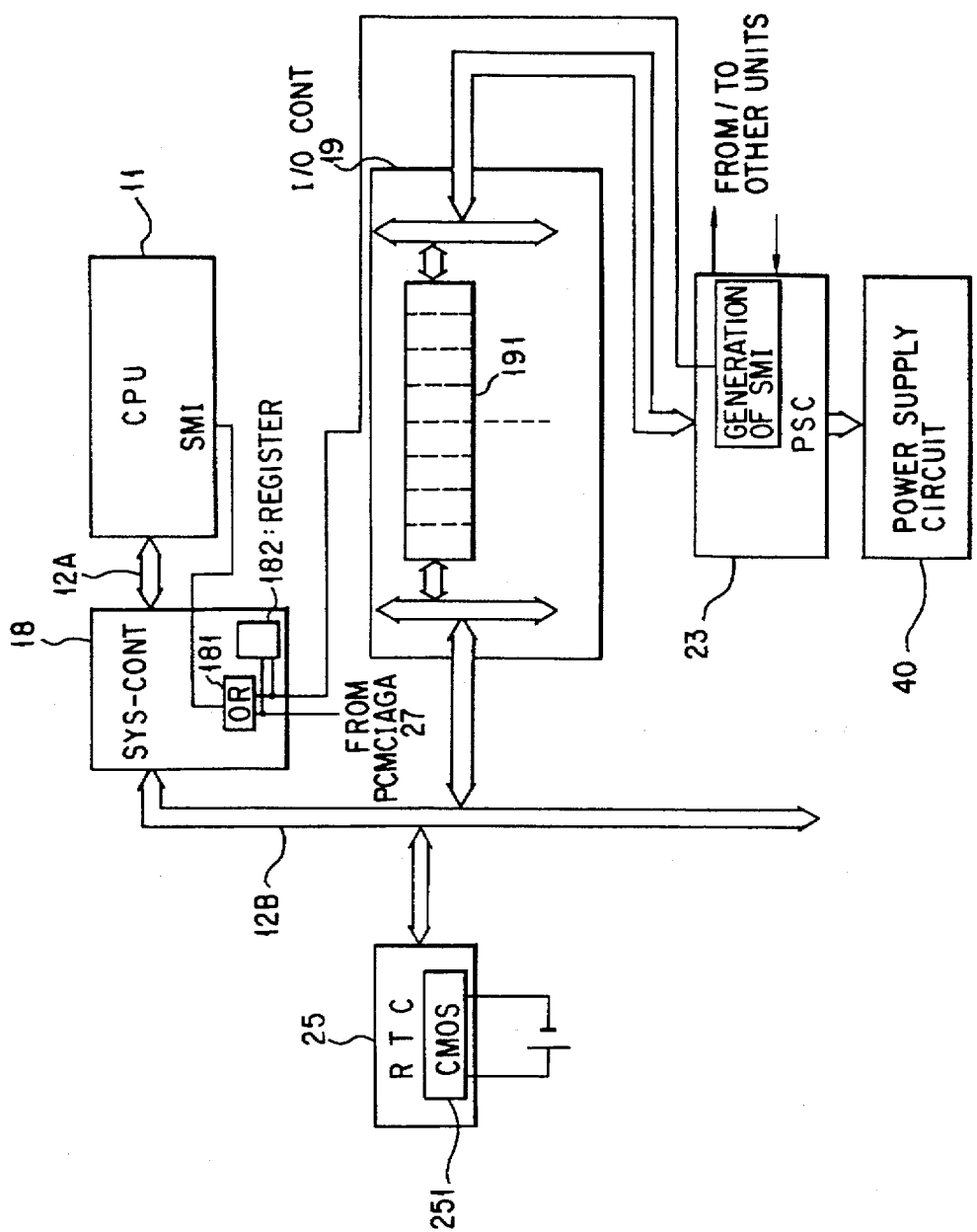
FIG. 9 is a diagram showing the hardware structure associated with to communication between the CPU of the personal computer of FIG. 1A and the power supply controller (PSC) thereof.

A power supply controller 23 showing FIGS. 1B and 9 serves to control a power supply circuit 40 to supply the power to the individual units in a system, and is constituted of a single-chip microcomputer. This power supply controller 23 manages the statuses of a reset switch 41, a main power switch 42, a battery 43 (first battery BATT1, second battery BATT2), an AC adapter 44, a display-panel open/close detection switch 45, etc., i.e., the power supply statuses. The power supply controller 17 also performs the lighting/luminance control of a back-light for the display panel and volume control of a loudspeaker 36.

The power supply controller 23 has two operation modes for communication with a CPU 11, namely an even mode and polling mode. Those modes can be changed by a command from the CPU 11. The power supply controller 23 includes a circuit for generating SMI signal.

In event mode, the power supply controller 23 monitors a change in power supply status. When detecting a change in power supply status, the power supply controller 23 sets the changed power supply status to a register 191. Then, the power supply controller 23 generates an SMI signal and transfers the SMI signal to the system controller 18.

With the power supply controller 23 in event mode, therefore, every time the power supply status changes, the CPU 11 is informed of the changed power supply status by the SMI signal. In response to the SMI signal, the CPU 11 executes a system management program to store the power supply status in the register 191 into a CMOS memory and then returns to the interrupted program.

When reading the power supply status becomes necessary, the CPU 11 reads the power supply status from the CMOS memory. The power supply status in the CMOS memory is used in the indication of the power supply status on a pop-up screen.

In polling mode, when the CPU 11 issues a status read request, the power supply controller 23 reads the requested power supply status and sets it in the register 191. In this case, is no SMI signal is generated.

Even in event mode, when the CPU 11 issues a status read request, the power supply controller 23 sets the requested power supply status in the register 191, as the in polling mode. In this case too, no SMI signal is generated.

A real time clock (RTC) 25, keyboard controller (KBC) 26, and PCMCIA gate array (PCMCIA GA) 25 are further connected to the system bus 12B.

The real time clock (RTC) 25 is a timepiece module having its own battery for operation and includes a CMOS type static RAM (which is hereinafter referred to as a CMOS memory) 251 which is always supplied with a power supply voltage from the battery. The CMOS memory 251 is used for storing operation environment or system configuration data indicating the system operation environment or configuration. Further, power supply status data such as the remaining battery capacity managed by the power supply controller 23, connection or disconnection of the battery, the type (dry cell, secondary battery) of the battery connected, and connection or disconnection of the AC adapter is also stored in the CMOS memory 251.

The operation environment or system configuration data in the CMOS memory 251 is rewritten by the hot key operation using SMI and the power supply status data in the CMOS memory 251 is also rewritten according to the power supply status which is informed to the CPU 11 from the power supply controller 23 based on the SMI.

The keyboard controller (KBC) 26 is used to control a built-in keyboard 29 incorporated in the computer body as standard equipment, and scans the key matrix of the built-in keyboard 29 to receive a signal corresponding to the depressed key and converts the received signal into a corresponding key code (scan code). The keyboard controller 26 has two communication ports P1, P2, and the communication port Pi is connected to the system bus 12A and the communication port P2 is connected to the PCMCIA gate array 27.

The key code corresponding to the hot key provided on the built-in keyboard 29 is transferred from the communication port P2 to the PCMCIA gate array 27 and set into the register in the PCMCIA gate array 27. In this case, an SMI is issued from the PCMCIA gate array 27 to inform the CPU 11 that the hot key is set in the ON state.

On the other hand, a key code other than the key code corresponding to the hot key is transferred from the communication port P1 to the system bus 12B as in the ordinary case. In this case, a keyboard interrupt signal (IRQ1) is generated from the keyboard controller 26 and supplied to the interrupt controller (PIC) of the I/O controller 19. The interrupt controller (PIC) issues a maskable hardware interrupt signal INTR to inform the CPU 11 that some key is depressed.

Further, the keyboard controller 26 has a function of controlling an external keyboard 30 which is optionally connected and a function of controlling a pointing stick 31 and a mouse 32 by use of an exclusive-use processor (IPS) 28.

The PCMCIA gate array (PCMCIA GA) 27 effects the read/write control of a 68-pin PCMCIA (Personal Computer Memory Card International Association) card 33 which is optionally provided and the transfer control of a hot key from the keyboard controller 26 to the CPU 11. Further, a pulse-width modulation circuit for driving and controlling a speaker 36 is provided in the PCMCIA gate array 27. A sound generated from the speaker 36 is adjusted by the frequency of a pulse signal output from the pulse-width modulation circuit, thereby making it possible to generate various alarm sounds such as a low battery alarm and panel closed alarm. Further, the volume of a sound generated from the speaker 36 can be adjusted by changing the amplitude of a pulse signal output from the pulse-width modulation circuit.

Next, the processing for changing of the operation environment by using hot key is experienced with reference to FIGS. 2 to 8.

In FIG. 2, a hardware logic provided in the PCMCIA gate array 27 for transfer control of a hot key is shown.

As shown in FIG. 2, an SMI generation circuit 271 for supplying an SMI signal to the CPU 11, an Fn status register 272 into which a scan code (make code/break code) of the hot key is set by the keyboard controller 26, and an SMI transmission register 273 into which data indicating generation of the SMI is set by the keyboard controller 26 are provided in the PCMCIA gate array 27.

As described before, the hot key is attained by a combination of several keys provided on the keyboard 29. More specifically, several hot key processes previously defined for the respective special keys can be selectively read out by simultaneously depressing an [Fn] key and another special key such as [F1], [F2], - - -, [F5] (Fn+special key).

When the [Fn] key and one of the special keys are depressed, the keyboard controller (KBC) 26 writes a scan code (make code) of the special key which is depressed at the same time as the [Fn] key into the Fn register 272 of the of the PCMCIA gate array 27 and then writes data "1" of SMI issuance in a bit 7 of the SMI transmission register 273 in order to inform the CPU 11 of key data of the hot key.

Also, when the [Fn] key is set back to the non-depressed position in a state in which the [Fn] key and the special key are kept depressed, the scan code and SMI issuance data "1" are respectively set into the Fn status register 272 and SMI transmission register 273 in the same manner as described before. In this case, a break code "00h" of the [Fn] key is used as the scan code set into the Fn status register 272.

When "1" is set in the bit 7 of the SMI transmission register 273, the SMI generation circuit 271 generates an SMI signal. The SMI signal is supplied to the SMI input of the CPU 11.

The CPU 11 interrupts the program which is now executed in response to the SMI signal and switches the operation mode into the SMM mode to execute the hot key processing routine.

Figure 4:
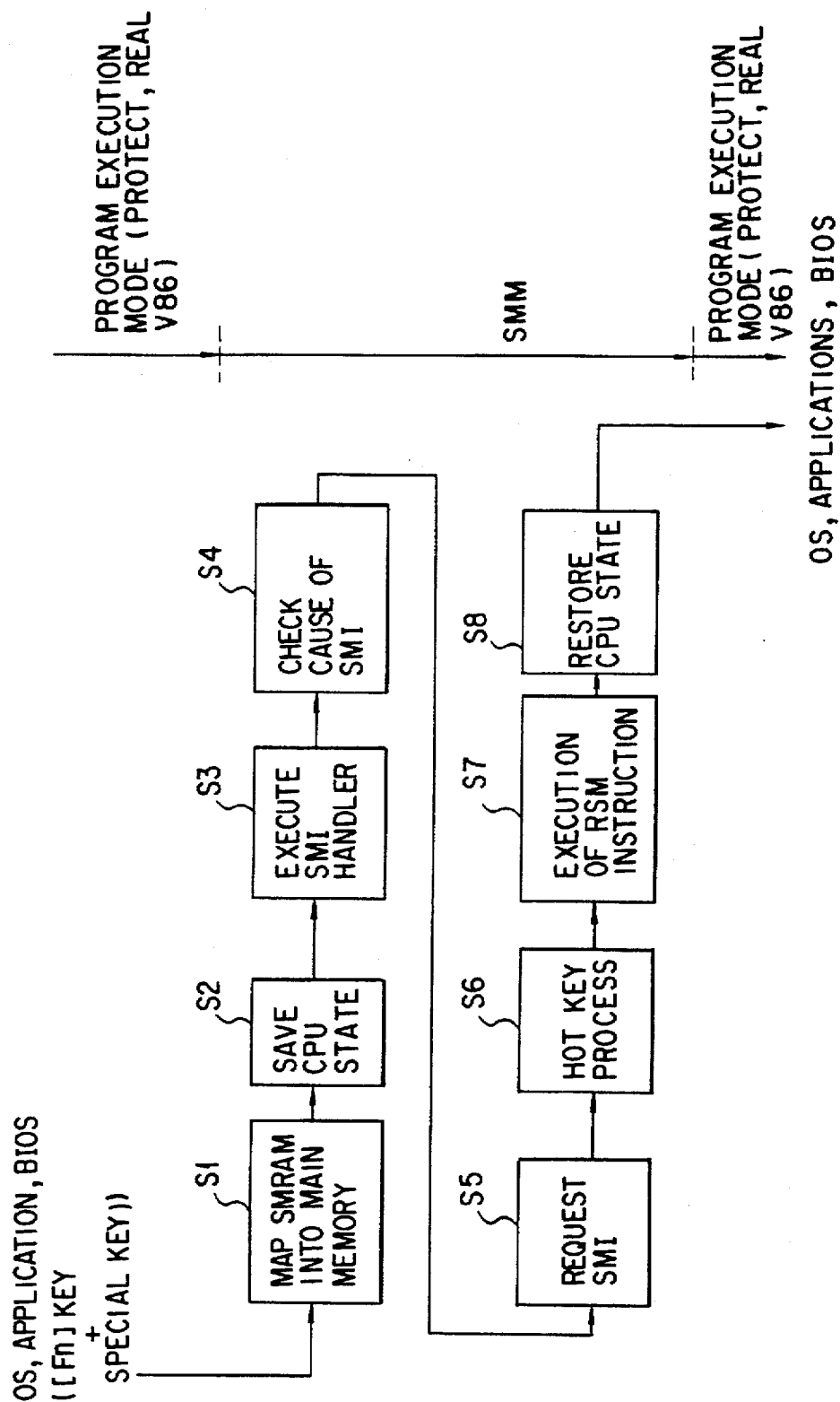
FIG. 4 is a diagram for illustrating the operation of the CPU in the personal computer of FIGS. 1A and 1B when a system management interrupt signal is generated.

Next, a sequence of operations of the CPU 11 when the SMI signal is generated is explained with reference to FIGS. 3 and 4.

When the [Fn] key and one of the special keys are depressed while the operating system, application program or system BIOS is being executed, an SMI signal is generated from the PCMCIA gate array 27.

When the SMI signal is input to the CPU 11, the CPU 11 is switched into SMM from the operation mode (protect mode, real mode or imaginary 86 mode) corresponding to the program now executed. When it is set into the SMM, the CPU 11 first maps the SMRAM 131 into an address space ranging from the address 30000H of the main memory 13 to the address 3FFFFH thereof (step S1). As a result, it becomes impossible to access the address space ranging from the address 30000H to the address 3FFFFH of the main memory 13, and instead of this, it becomes possible to access the SMRAM 131.

The SMRAM 131 contains a CPU state storage area al and Fn status code storage area a2 and a jump code (JMP) for specifying the SMI handler of the ROM 117 as an interrupted destination is set in the SMRAM. As described before, the IRT routine, SMI handler, a plurality of BIOS drivers and various SMI service routines including the hot key processing routine are stored in the BIOS ROM 17.

Next, the CPU 11 saves the CPU status (which is sometimes called context) which is the contents of the respective registers of the CPU 11 set when the SMI is input into the CPU status storage area al of the SMRAM 131 in a stacked form (step S2). Then, the CPU 11 fetches the code of the start address (38000H) of the SMM, that is, a jump code set in the address 38000H of the SMRAM 131 and executes the SMI handler of the BIOS ROM 17 specified by the jump code (step S3). The process of the steps Si to S3 is effected by the CPU 11 itself, that is, by the microprogram of the CPU 11.

The SMI handler read out by execution of the jump code checks the cause of generation of SMI in order to determine the factor which causes generation of the SMI (step S4). In this process, the register 273 of the PCMCIA gate array 27 is referred to. If the SMI is caused by the hot key operation, the SMI handler requests execution of a specified hot key processing routine among the SMI service routine of the BIOS ROM 17 (step S5). The requested hot key processing routine is executed in the SMM (step S6).

The hot key processing function to be effected in response to the SMI caused by the hot key is determined according to the content of the Fn status code which is a code stored in the Fn status register 272. The relation between the Fn status codes and the hot key processing functions to be effected is as follows:

| [Fn status code] | [Content of Hot Key Processing Function] |
|---|---|
| F1 | Instant Security |
| F2 | Switching of Power Save Mode |
| F3 | Switching of Resume Mode/Boot Mode |
| F4 | Switching of Volume of Speaker |
| F5 | Switching of LCD/CRT Display |
| F6 | Display of Reversal of Black and White of LCD Panel |
| → | Contrast Up |
| ←. | Contrast Down |

In the above hot key processes, operations such as rewriting of corresponding operation environment or system configuration data of the CMOS memory 251 and transfer of command to a corresponding hardware module are effected. Further, when the hot key processing function corresponding to F2 or F3 is effected, storage of Fn status code (scan code of F2 or F3) into the Fn status code storage area a2 of the SMRAM 131 is effected in addition to the rewriting of operation environment or system configuration data. The Fn status code of the SMRAM 131 is used in the pop-up window display process.

The hot key processing routine executes the resume (RSM) instruction when the function thereof is completed (step S7). The CPU status is restored from the SMRAM 131 into the CPU register by execution of the RSM instruction (step S8), and as a result, the CPU 11 is set free from the SMM and returned to the operation mode which was set before generation of the SMI so as to effect the control operation for the operating system, application program or BIOS which is interrupted.

Next, the specific contents of the respective hot key functions effected in the hot key processing routine are explained.

(1) Fn+F1 (Instant Security)

The instant security function is a security protecting function for preventing the content of the process now executed from being observed by others, and when the hot key (Fn+F1) is input, the display image plane provided by the program now executed is turned off and the keyboard is locked so as to make key input invalid.

In the key lock state, a key code input via the keyboard 29 is transmitted to the CPU 11 by the SMI and sequentially saved into a stack. The saved key code group is compared with the user password which is registered in the CMOS memory 251, and if they coincide with each other, the key lock state is released and the image display is permitted.

Thus, the password verifying process of the instant security function is completely effected in the hot key processing routine by use of the user password of the CMOS memory 251. In this case, the user password of the instant security function is commonly used as a user password which is used in the power-ON password verifying process effected at the time of turn-ON of the system power supply in order to simplify the operations such as registration/change/deletion of the password for the CMOS memory 251.

(2) Fn+F2 (Switching of Power Save Mode)

The power save mode switching function is a function of selecting one of a plurality of power save modes (full power mode, low power mode, user setting mode) having different amounts of power consumption, and the power save mode now set is switched to a different mode in a toggle fashion each time the hot key of (Fn+F2) is input.

In this case, if the (Fn+F2) key is depressed, switching of the power save mode is not effected at the first time of depression. However, in order to indicate the present power save mode to the user by use of the pop-up window, the scan code of F2 is stored into the SMRAM 131 as the Fn status code.

Figure 5:
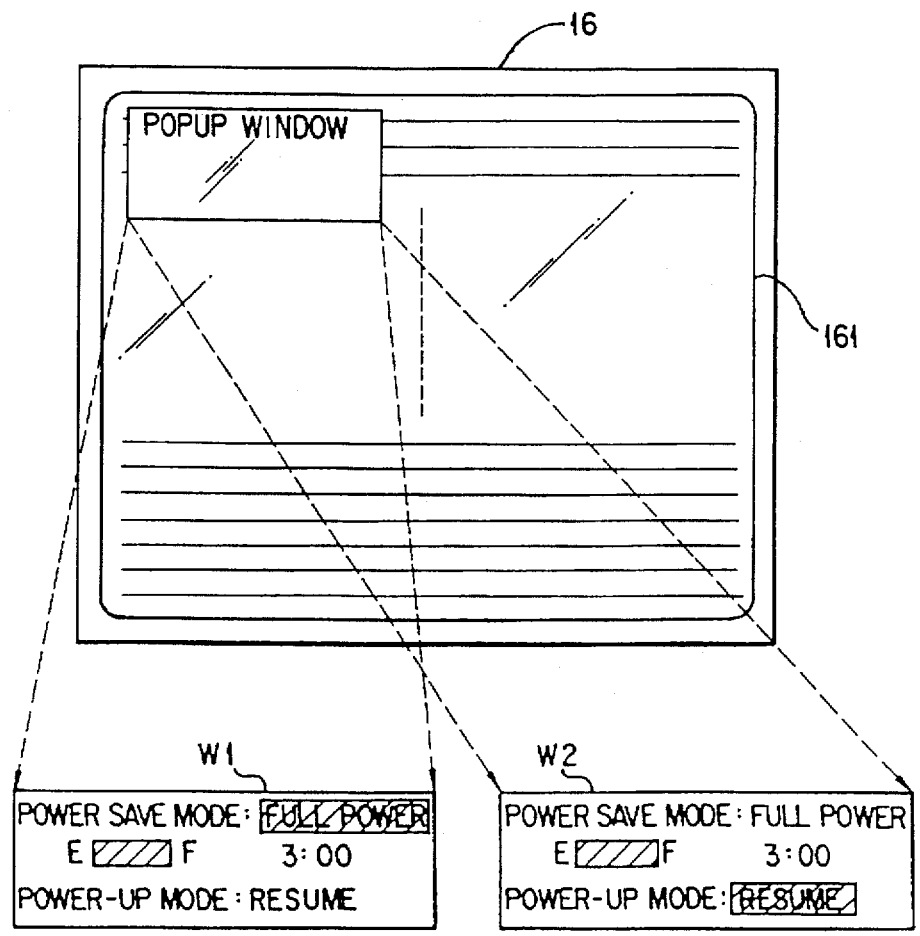
FIG. 5 is a diagram showing one example of a pop-up window in the personal computer of FIGS. 1A and 1B.

For example, if the (Fn+F2) key is depressed when the present power save mode is set in the full power mode, a pop-up window Wi is displayed on the lower left portion of an application image plane 161 now executed as shown in FIG. 5, thus indicating to the user that the present power save mode is set in the full power mode.

As shown in FIG. 5, items indicating the power save mode, power-up mode, remaining battery capacity are defined in the pop-up window Wi and only a to-be-changed item (in this example, item indicating the power save mode) specified by the Fn status code of the SMRAM 131 is displayed in a reversed form. The present mode indicated by the operation environment or system configuration data of the CMOS memory 251 is displayed in each of the items indicating the power save mode, power-up mode, and remaining battery capacity. The remaining battery capacity is displayed by time information ("3:00" indicates that the remaining serviceable time is three hours) indicating the remaining serviceable time of the battery and an index (the fully charged state is indicated when all the area between E and F is displayed in a reversed form and the length of the reverse display area becomes shorter as the remaining capacity is reduced) indicating the charging degree of the battery (percent).

When the F2 key is depressed again while the Fn key is kept depressed, switching of the power save mode is effected. To-be-switched items are as follows.

1) Full Power Mode
2) Low Power Mode
3) User Setting Mode

The power save modes are set up by different combinations of setting states such as the CPU clock, CPU sleep mode, HDD auto-off and display auto-off, and the power consumption is highest in the full power mode and lowest in the low power mode. In the user setting mode, settings of the CPU clock frequency, CPU sleep mode, display auto-off and HDD auto-off are determined according to the contents specified by the user in the set-up process, for example.

The power save mode is sequentially switched in an order of 1)→2)→3)→1) - - - each time the (Fn+F2) key is depressed. In this case, corresponding operation environment or system configuration data of the CMOS memory 161 is updated according to the mode switching and setting (setting of the CPU clock frequency, CPU sleep mode, display auto-off and HDD auto-off) of the hardware based on the operation environment or system configuration data is changed.

While the Fn key is kept depressed, the pop-up window W1 is continuously displayed and the item of the power save mode of the pop-up window W1 of the CMOS memory 251 is sequentially changed in an order of "Full Power Mode", "Low Power Mode", and "User Setting Mode" each time the (Fn+F2) key is depressed. This is because the pop-up window processing routine is periodically and repeatedly effected by the timer interrupt and the display process of the pop-up window Wi is effected based on the operation environment or system configuration data of the CMOS memory 251 for each time.

(3) Fn+F3 (Switching of Resume/Boot Mode)

The resume/boot mode switching function is a function of switching the operation mode (Power-Up Mode) of the system at the time of turn-ON of the power supply from the resume mode to the boot mode or from the boot mode to the resume mode, and the mode switching is effected each time the (Fn+F3) key is depressed.

The resume mode is a power-up mode for storing the state set immediately before the power supply is turned OFF into a backed-up memory and restoring the content of the backed-up memory at the time of next turn-ON of the power supply so as to return the system to the state which was set immediately before the power supply was turned OFF. The boot mode is a power-up mode for initializing the system and starting the operating system at the time of turn-ON of the power supply.

When the (Fn+F3) key is depressed, switching of the power-up mode (resume/boot) is not effected at the first time of depression. However, in order to indicate the present power-up mode to the user by use of the pop-up window, the scan code of F3 is stored into the SMRAM 131 as the Fn status code.

For example, if the (Fn+F3) key is depressed when the present power save mode is set in the resume mode, a pop-up window W2 is displayed on the lower left portion of an application image plane 161 now executed as shown in FIG. 5, thus indicating to the user that the present power-up mode is set in the resume mode.

As shown in FIG. 5, only a to-be-changed item specified by the Fn status code of the SMRAM 131, that is, only an item indicating the power-up mode is displayed in a reversed form in the pop-up window W2.

When the F3 key is depressed again while the Fn key is kept depressed, switching of the power-up mode is effected. To-be-switched items are as follows.

1) Resume Mode
2) Boot Mode

The modes are sequentially switched in an order of 1)→2)→1) - - - each time the (Fn+F3) key is depressed. In this case, corresponding operation environment or system configuration data of the CMOS memory 161 is updated according to the mode switching.

While the Fn key is kept depressed, the pop-up window W2 is continuously displayed and the item of the power-up mode of the pop-up window W2 of the CMOS memory 251 is sequentially changed in an order of "Resume Mode", "Boot Mode", and "Resume Mode" each time the (Fn+F3) key is depressed. (4) Fn+F4 (Switching of Volume of Speaker) The function of switching the volume of the speaker is a function of adjusting the volumes of various alarm sounds generated from the speaker 36 and the volume of the speaker is gradually changed each time the (Fn+F4) key is depressed. The changing of the speaker volume permits the volumes of the system speaker, low battery alarm and panel closed alarm to be simultaneously adjusted. To-be-changed items are as follows.

1) Speaker Off
2) Small Volume
3) Medium Volume
4) Large Volume

The above states are sequentially switched in an order of 1)→2)→3)→4)→1) - - - each time the (Fn+F4) key is depressed.

The switching is effected by changing the amplitude of a pulse signal output from the pulse width modulation circuit of the PCMCIA gate array 27.

(5) Fn+F5 (Switching of LCD/CRT Display)

The LCD/CRT display switching function is a function of switching display monitors whose display operations are controlled by the VGA controller 14 and a to-be-displayed monitor is switched each time the (Fn+f5) key is depressed.

To-be-changed items are as follows.

1) LCD Display
2) Simultaneous Display of LCD and CRT
3) CRT Display

The above states are sequentially switched in an order of 1)→2)→3)→1) - - - each time the (Fn+F5) key is depressed.

The switching is effected by issuing a display mode setting command to the VGA controller 14.

(6) Fn+F6 (Display of Reversal of Black and White of LCD Panel)

The function of displaying the reversal of black and white is a function of reversing black and white between the foreground and the background of the LCD display image plane displayed in the monochromic manner by the VGA controller 14, and the normal display (foreground=black and background=white) and the reversal display (foreground=white and background=black) are alternately changed each time the (Fn+F6) key is depressed.

(7) Fn+→(Contrast Up)

The contrast-up function is a function of gradually enhancing the contrast of the monochromic display LCD and the LCD contrast is enhanced by one step each time the (Fn+→) key is depressed.

(8) Fn+←(Contrast Down)

The contrast-down function is a function of gradually lowering the contrast of the monochromic display LCD and the LCD contrast is lowered by one step each time the (Fn+←) key is depressed.

Adjustment of the LCD contrast can be realized by variously setting the voltage level of a contrast control signal supplied from the power supply controller 23 to the LCD panel, for example.

As described above, in the personal computer, the hot key processing routine of BIOS can be started simply by the hot key operation so as to variously change the system operation environment or configuration. Further, when the power save mode switching function (Fn+F2) and the resume/boot mode switching function (Fn+F3) are effected, the pop-up window is automatically displayed on the display image plane so that the user can confirm the mode set before the change and the mode set after the change while effecting the hot key operation.

Next, the relation between the system operation environment or configuration changing process by the hot key processing routine and the pop-up window display process by the pop-up processing routine is explained with reference to FIG. 6.

Now, a case wherein the F2 key is depressed three times while the Fn key is kept depressed so as to switch the power save mode from the present full power mode to the user setting mode is explained as an example.

When the first input operation of the (Fn+F2) key is effected by the user, an SMI is issued. The CPU 11 interrupts the program which is now executed and is set into the SMM. In the SMM, the hot key processing routine (Fn+F2 routine) corresponding to the F2 key is executed after the CPU status is saved into the SMRAM 131. In the hot key processing routine, an Fn status code saved in the SMRAM 131 is read out, and if it is "00h", it is determined that the input operation is the first input operation of the (Fn+F2) key. Then, in the hot key processing routine, the interrupted program is returned by executing an RSM instruction after the Fn status code (scan code of F2) set in the Fn status register 272 is saved into the SMRAM 131.

After this, when the F2 key is depressed for the second time while the Fn key is kept depressed, the CPU 11 is set into the SMM again and executes the hot key processing routine. In the hot key processing routine, an Fn status code set in the Fn status register 272 and an Fn status code saved in the SMRAM 131 are compared with each other, and if they coincide with each other, it is determined that the input operation is the second or succeeding input operation of the (Fn+F2) key. Then, in the hot key processing routine, rewriting of the CMOS memory 251 and hardware setting are effected so as to switch the power save mode from the present mode (full power mode) to the next mode (low power mode).

When the F2 key is depressed for the third time while the Fn key is kept depressed, the CPU 11 is set into the SMM again and executes the hot key processing routine. In the hot key processing routine, if the input operation is determined to be the second or succeeding input operation of the (Fn+F2) key, rewriting of the CMOS memory 251 and hardware setting are effected so as to switch the power save mode from the present mode (low power mode) to the next mode (user setting mode).

After this, if the Fn key is returned to the original position, the CPU 11 is set into the SMM again and executes the hot key processing routine. In the hot key processing routine, completion of a sequence of the hot key operations of the (Fn+F2) key is detected based on the fact that the Fn status code set in the Fn status register 272 is a break code "00h" of the Fn key, and the break code "00h" of the Fn key is saved into the SMRAM 131 as the Fn status code.

Further, the pop-up processing routine is effected by the CPU 11 each time a timer interrupt is issued (for every 55 ms).

That is, when a timer interrupt occurs, the CPU 11 interrupts the program now executed and executes the pop-up processing routine of system BIOS after saving the CPU status into the stack. In the pop-up processing routine, a pop-up window is opened on the display image plane according to the Fn status code of the SMRAM 131 and the operation environment or system configuration data of the CMOS memory 131 if an Fn status code F2 or F3 is set in the Fn status register. After this, the process is returned to the interrupted program while the pop-up window is kept open in the pop-up processing routine.

If neither the Fn status code F2 nor F3 is set in the Fn status register 272, the pop-up processing routine is returned to the interrupted program.

For this reason, the pop-up window is not displayed until the first input operation of the (Fn+F2) key is effected, and the pop-up window is opened by the first timer interrupt after the first input operation of the (Fn+F1) key is effected. In the pop-up window, the item of the power save mode is set in the "full power mode".

After this, the display process of the pop-up window is repeatedly effected in the pop-up processing routine according to the Fn status code of the SMRAM 131 and the operation environment or system configuration data of the CMOS memory 131 until an Fn break code is set into the Fn status register.

Therefore, if the second input operation of the (Fn+F2) key is effected, the item of the power save mode of the pop-up window is changed from the "full power mode" to the "low power mode", and if the third input operation of the (Fn+F2) key is effected, the item of the power save mode is changed from the "low power mode" to the "user setting mode".

After this, if the pop-up processing routine is executed while the Fn break code is set in the Fn status register, the pop-up processing routine closes the pop-up window which is opened.

As described above, the operation environment or system configuration data (power save mode, remaining battery capacity (time), and power-up mode) stored in the CMOS memory 251 is read out and displayed by the pop-up processing which is executed in response to the timer interrupt. During depressing the Fn key, the CPU 11 may read the operation environment or system configuration data entirely whenever the CPU 11 executes the pop-up processing. Also, the CPU 11 may read the operation environment or system configuration data entirely at the first execution of the pop-up processing, and read changed information of the operation environment or system configuration data at the execution of the pop-up processing after the first execution. That is, in the above embodiment, the CPU 11 may read out the whole operation environment or system configuration data every time the pop-up processing is executed between the time when the first input operation of the (Fn+F2) key is effected and the time the Fn key is returned to the original position. Also, after the first input operation of the (Fn+F2) key, the CPU 11 may read out and displayed the whole operation environment or system configuration data stored in the CMOS memory 251 at the first execution of the pop-up processing, and read out the changed data the operation environment or system configuration data stored in the CMOS memory 251 so as to change the displayed information before the Fn key is returned to the original position.

Figure 7A:
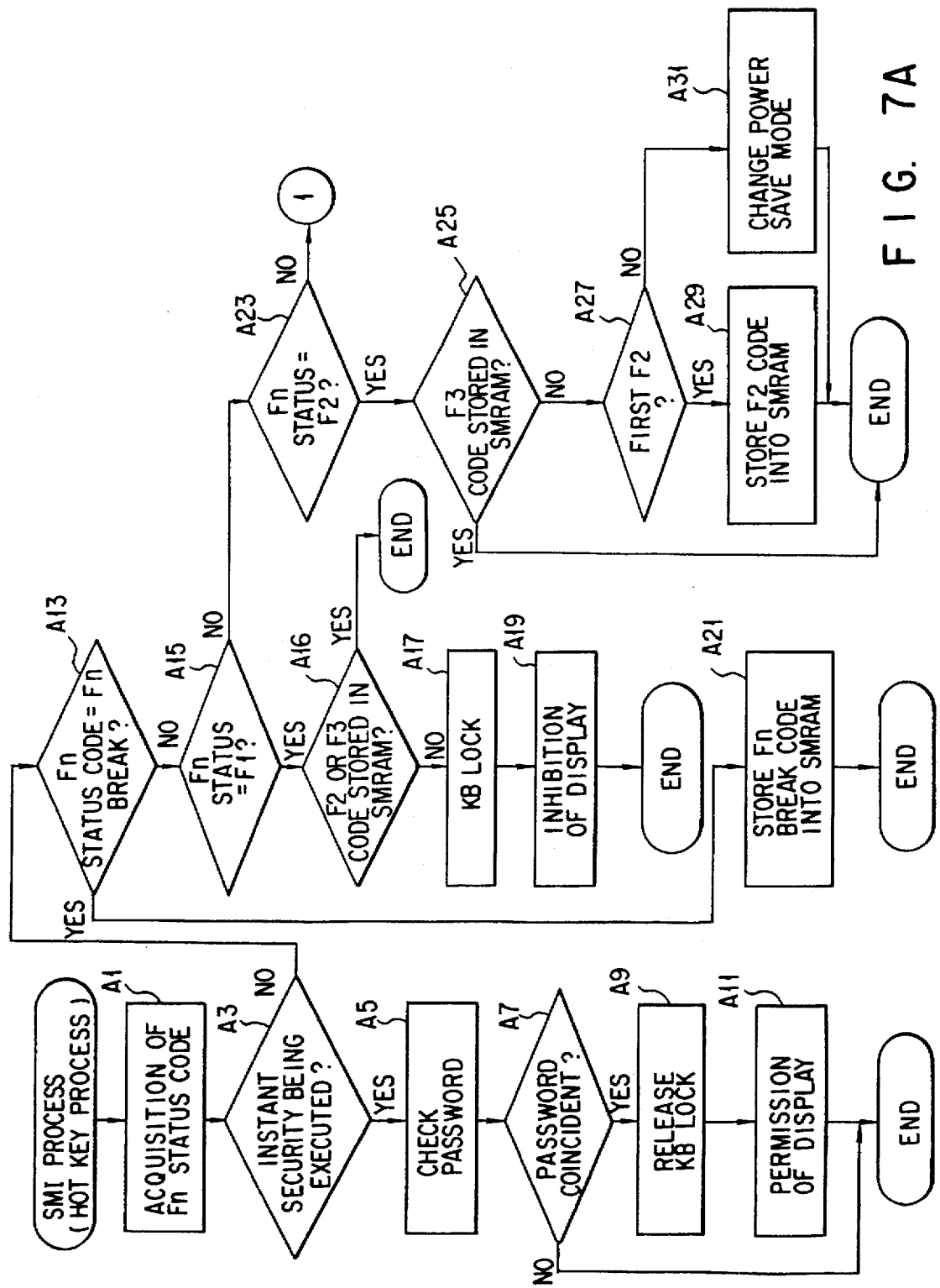

Next, the entire operation procedure for changing the operation environment by the hot key processing routine is explained with reference to FIGS. 7A and 7B. For brevity, a case wherein five hot keys F1 to F5 are supported is explained as an example.

In the hot key processing routine, the Fn status code is read out from the Fn status register 272 (step A1), and then whether the instant security function is being executed or not is checked (step A3). Whether the instant security function is being executed or not can be checked by referring to the operation environment or system configuration data relating to the instant security function of the CMOS memory 251. If the instant security function is being executed, the password checking process is effected in the hot key processing routine (steps A5, A7).

In the password checking process, scan codes transmitted from the keyboard controller 29 are sequentially saved into the stack, and when a scan code corresponding to the "Enter" key is received, collation of the user password is effected.

That is, while the instant security function is being executed, the keyboard controller (KBC) 26 is set in the SMI generation mode like a case wherein the hot key is input, and all of the key inputs from the keyboard 29 or external keyboard 30 are transmitted to the CPU 11 via SMI. Therefore, while the instant security function is being executed, the hot key processing routine is effected each time the hot key is input and a scan code from the keyboard 29 is saved into the stack. When a scan code from the keyboard 29 is a scan code corresponding to the "Enter" key, the saved scan code group and the user password previously registered in the CMOS memory 251 are compared with each other in the hot key processing routine so as to collate the user password.

If the scan code coincides with the password, commands are transferred to the keyboard controller 26 and VGA controller 14 to permit display of the image plane and release the key lock (steps A9, A11) in the hot key processing routine, and then the control operation is returned to the program which was executed before generation of the SMI by executing an RSM instruction. On the other hand, if the scan code does not coincide with the password, the control operation is returned to the program which was executed before generation of the SMI in the hot key processing routine while the instant security mode is kept set.

If it is detected in the step A3 that the instant security function is not being executed, the hot key processing routine goes to the following process.

That is, in the hot key processing routine, whether or not the Fn status code obtained in the step A1 is the break code "00h" of the Fn key is checked (step A13), and if the status code is the break code "00h" of the Fn key, it is stored into the SMRAM 131 (step A21).

If the status code is not the break code of the Fn key, one of codes of the F1 to F5 keys which corresponds to the Fn status is detected (steps A15, A23, A33, A43, A51) in the hot key processing routine and a hot key function corresponding to the key code is effected.

If it is the code of the F1 key (step A15, YES), at first, it is determined that the code stored in the Fn status code storage area 131a2 of the SMRAM 131 is the scan code of the F2 key or the F3 key (step A16). If the code stored in the Fn status code storage area 131a2 is either the scan code of the F2 key or the scan code of the F3 key (step A16, YES), the pop-up window is already displayed so as to set (switch) either the power save mode corresponding to the F2 key or the power-up mode corresponding to the F3 key is already set. Therefore, the SMI processing routine (hot key processing routine) is terminated. If the code stored in the Fn status code storage area 131a2 is neither the scan code of the F2 key nor the scan code of the F3 key (step A16, NO), a process for effecting the instant security function is effected in the hot key processing routine.

That is, a key lock command is first transferred to the keyboard controller (KBC) 26 to specify the key lock (step A17) in the hot key processing routine. The command transfer is effected via the communication register of the PCMCIA gate array 27. In response to the command, the keyboard controller (KBC) 26 locks all of the input devices, that is, keyboard 29, external keyboard 30, pointing stick 31 and mouse 32 and is set into the SMI generation mode. Then, in the hot key processing routine, a command is transferred to the VGA controller 14 to turn OFF the display image planes of the display units 16 and 35 (step A19). In this example, supply of video data to the panel display unit 16 and CRT display unit 35 from the VGA controller 14 is interrupted.

If the Fn status code is detected to be the F2 code (step A23, YES), at first, it is determined that the code stored in the Fn status code storage area 131a2 of the SMRAM 131 is the scan code of the F3 key (step A25). If the code stored in the Fn status code storage area 131a2 is the scan code of the F3 key (step A25, YES), the pop-up window is already displayed so as to set (switch) the power-up mode. Therefore, the SMI processing routine is terminated. If the scan code of the F3 key is not the code stored in the Fn status code storage area 131a2 (step A25, NO), the following process for switching the power save mode is effected in the hot key processing routine.

That is, the hot key processing routine determines whether or not the input operation is the first input operation of the (Fn+F2) key by comparing the Fn status code of the SMRAM 131 with the code of the Fn status register 272 (step A23). In the hot key processing routine, if it is the first input operation, the F2 key code is stored into the SMRAM 131 (step A29), and if it is the second or succeeding input operation, rewriting of operation environment or system configuration data associated with the power save mode of the CMOS memory 251 and hardware setting are effected and then the present power save mode is switched to another mode in an order described before (step A31).

If the Fn status code is detected to be the F3 code (step A26, YES), at first, it is determined that the code stored in the Fn status code storage area 131a2 is the scan code of the F2 key (step A35). If the code stored in the Fn status code storage area 131a2 is the scan code of the F2 key (step A35, YES), the pop-up window is already displayed so as to switch the power save mode. Therefore, the SMI processing routine is terminated to disable the F3 key depression. If the scan code of the F2 key is not the code stored in the Fn status code storage area 131a2 (step A35, NO), the following process of switching the power save mode is effected in the hot key processing routine.

That is, the hot key processing routine determines whether or not the input operation is the first input operation of the (Fn+F3) key by comparing the Fn status code of the SMRAM 131 with the code of the Fn status register 272 (step A37). In the hot key processing routine, if it is the first input operation, the F3 key code is stored into the SMRAM 131 (step A39), and if it is the second or succeeding input operation, rewriting of operation environment or system configuration data associated with the power save mode of the CMOS memory 251 and switching of the resume/boot mode are effected (step S41).

If the Fn status code is detected to be the F4 code (step A43, YES), at first, it is determined that the code stored in the Fn status code storage area 131a2 is either the scan code of the F2 key or the scan code of the F3 key (step A44). If the code stored in the Fn status code storage area 131a2 is either the scan code of the F2 key or the scan code of the F3 key (step A44, YES), the pop-up window is already displayed so as to switch either the power save mode or the power-up mode. Therefore, the SMI processing routine is terminated to disable the F4 key depression. If the code stored in the Fn status code storage area 131a2 is neither the scan code of the F2 key nor the scan code of the F3 key (step A44, NO), the following process for changing the speaker volume is effected in the hot key processing routine.

That is, the hot key processing routine determines whether or not the input operation is the first input operation of the (Fn+F4) key by comparing the Fn status code of the SMRAM 131 with the code of the Fn status register 272 (step A45). In the hot key processing routine, if it is the first input operation, rewriting of operation environment or system configuration data associated with the speaker volume and hardware setting are effected and the speaker volume is turned off (step A47). IF it is the second or succeeding input operation, rewriting of operation environment or system configuration data associated with the speaker volume and hardware setting are effected and then the present speaker volume is changed to another volume in an order as described before (step A49).

If the Fn status code is detected to be the F5 code (step A51, YES), at first, it is determined that the code stored in the Fn status code storage area 131a2 is either the scan code of the F2 key or the scan code of the F3 key (step A52). If the code stored in the Fn status code storage area 131a2 is either the scan code of the F2 key or the scan code of the F3 key (step A52, YES), the pop-up window is already displayed so as to switch either the power save mode or the power-up mode. Therefore, the SMI processing routine is terminated to disable the F4 key depression. If the code stored in the Fn status code storage area 131a2 is neither the scan code of the F2 key nor the scan code of the F3 key (step A52, NO), the following process for LCD/CRT switching is effected in the hot key processing routine.

That is, in the hot key processing routine, rewriting of display mode information associated with the LCD/CRT switching of the CMOS memory 251 and hardware setting are effected and then the present mode is switched to another mode in an order as described before (step A53).

By the above processes of steps A16, A25 A35, A44 and A52, an exclusive processing of either the power-up mode or the power save mode is effected, while that the pop-up window is displayed. Accordingly, after input operation of the (Fn+F2) key is executed to switch the power save mode, if an operator depresses the F3 key mistakenly while the Fn key is depressed, this input operation of the (Fn+F3) key is disabled. Therefore, the pop-up window displaying for switching the power save mode is maintained.

Figure 8:
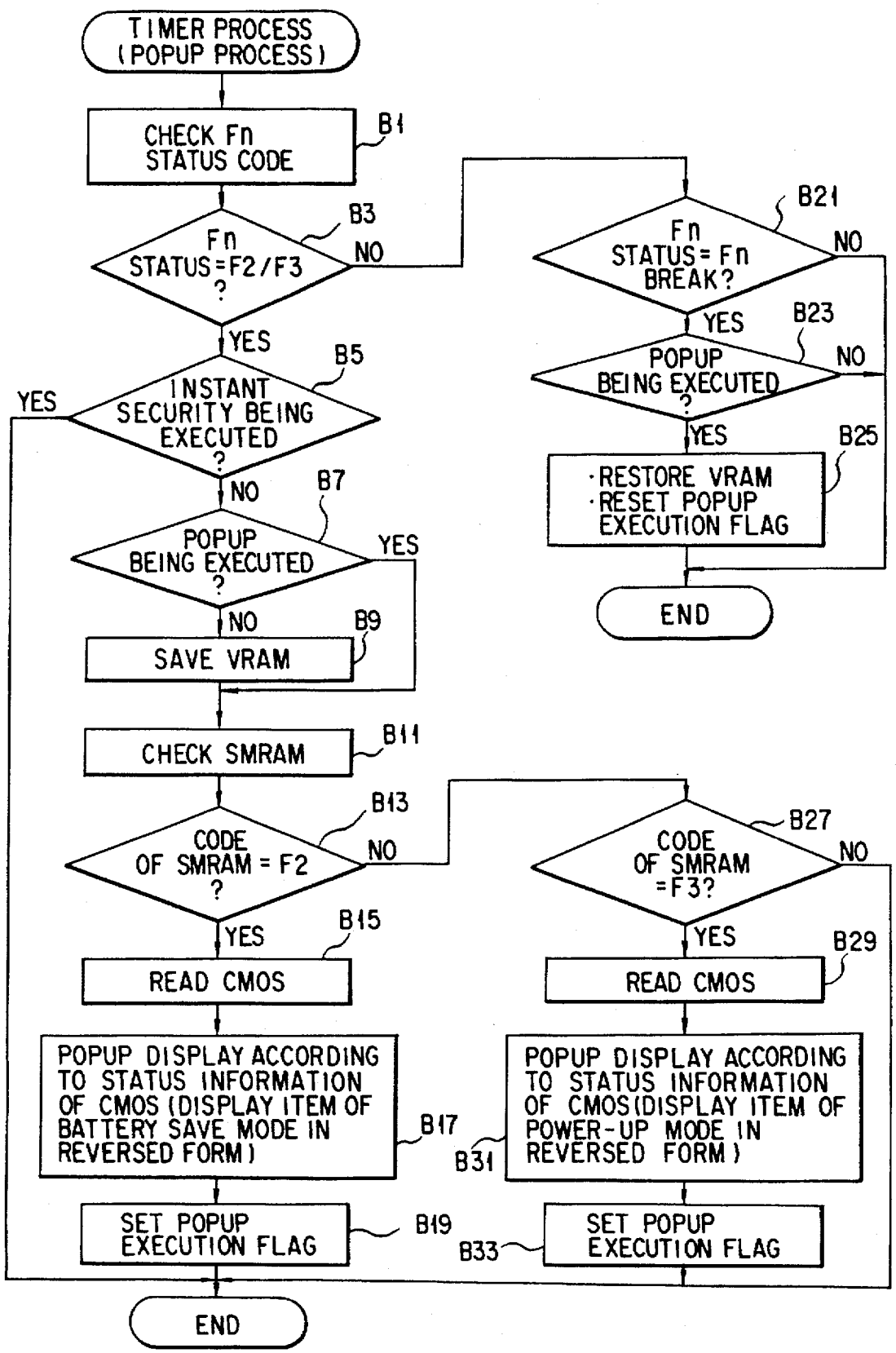
FIG. 8 is a flow chart showing the procedure of the pop-up processing routine in the personal computer of FIGS. 1A and 1B.

Next, the procedure of displaying the pop-up window by the pop-up processing routine is explained with reference to FIG. 8.

In the pop-up processing routine executed by the timer interrupt, the Fn status code in the SMRAM 131 or Fn status register 272 is first checked (step B1) to check whether the Fn status code is the F2 or F3 key code (step B3). If it is the F2 or F3 key code, whether the instant security function is being executed or not is checked (step B5) by referring to the operation environment or system configuration data associated with the instant security of the CMOS memory 251 in the pop-up processing routine.

If it is detected that the instant security function is being executed, the process in the pop-up processing routine is instantly terminated.

On the other hand, if it is detected that the instant security function is not being executed, the following process is effected.

That is, whether the pop-up window is displayed or not is first checked (step B7) in the pop-up processing routine. The checking operation is effected by referring to a pop-up execution flag set in the CMOS memory 251.

If it is detected that the pop-up window is not displayed, video data of the VRAM 15 is first saved into a preset memory area in order to open the pop-up window in the pop-up processing routine (step B9). In this case, at least video data which corresponds to the pop-up window display position is displayed. If the pop-up window is being displayed, the process of step S45 is not effected since video data of the VRAM 15 is already saved.

Next, in the pop-up processing routine, the Fn status code of the SMRAM 131 is checked to determine whether the Fn status code is the F2 or F3 key code (step B11, B13, B27).

If it is detected that the Fn status code is the F2 key code, information associated with the power supply status, power-up mode and power save mode stored in the CMOS memory 251 is read out and a pop-up window is displayed on the image plane according to the readout information (step B15, B17) in the pop-up processing routine. In this case, the item of the power save mode which is to be changed is displayed in a reversed form. Then, in the pop-up processing routine, a pop-up execution flag indicating that the pop-up window is being displayed is stored in the CMOS memory 251 (step B19) and then the process is terminated.

If it is detected that the Fn status code is the F3 key code, information associated with the power supply status, power-up mode and power save mode stored in the CMOS memory 251 is read out and a pop-up window is displayed on the image plane according to the readout information (step B29, B31) in the pop-up processing routine. In this case, the item of the power save mode which is to be changed is displayed in a reversed form. Then, in the pop-up processing routine, a pop-up execution flag indicating that the pop-up window is being displayed is stored in the CMOS memory 251 (step B33) and then the process is terminated.

On the other hand, in the step B3, if it is detected in the step S42 that the Fn status code is a key code other than the F2 or F3 key code, whether the Fn status code is a break code of the Fn key or not is checked in the pop-up processing routine (step B21). If it is the break code of the Fn key, whether the pop-up window is being displayed or not is checked (step B23) by referring to the POPUP execution flag of the CMOS memory 251 in the pop-up processing routine. If the pop-up window is being displayed or opened, the content of the VRAM 15 is restored and a POPUP execution flag indicating that the pop-up window is closed is stored into the CMOS memory 251 in order to close the pop-up window in the pop-up processing routine and then the process is terminated (step B25).

As described above, in this embodiment, since instruction of switching of the system operation environment or configuration such as the power save mode and power-up mode is input by the hot key operation using SMI, hot key data of the hot key can be instantly received by the CPU 11 even if any type of application program is being executed, and the operation environment is changed. Further, when the system operation environment or configuration such as the power save mode and power-up mode is changed, the pop-up window indicating the present system operation environment or configuration is automatically opened on the display image plane according to the rewritten operation environment or system configuration data of the CMOS memory 251. Therefore, even if a display lamp or display unit exclusively used for status display is not provided on the computer body as in the conventional system having the hot key function, the operation mode switched by the hot key function can be instantly indicated to the user.

As a result, the number of parts can be reduced and the cost can be lowered, and systems which are particularly suitable for sub-note type personal computers can be realized.

Further, in this embodiment, different interrupt processing functions are used in the hot key function and the window display function, and the hot key function is realized by the system management interrupt (SMI) and the window display function is realized by the timer interrupt.

The SMI is a non-maskable highest-priority hardware interrupt signal for permitting the system management mode of the CPU 11 to be used, and as a result, the function of saving the CPU status at the time of generation of SMI and restoring the CPU status at the time of completion of the interrupt process so as to recover the state which was set before generation of the interrupt can be provided. Thus, reception of the hot key and changing of the operation environment or system configuration data can be effected without giving any influence on the application program now executed.

Further, only the system operation environment or configuration changing process is effected in the system management mode and the window display is effected by the timer process. Therefore, for example, even if the hot key is depressed while the communication program is being executed, execution of the communication program is interrupted only for an extremely short period of time until the operation environment or system configuration data and hardware setting are changed. Thus, there occurs no problem that a communication error is caused by a long period of interruption of the communication program.

Further, the timer process is repeatedly effected at preset regular periods, but only the process of checking the Fn status code and the process for opening/closing the window are effected in one timer process. In this case, if the F2 or F3 key is set in the ON state, the window is opened and the timer process is terminated while the window is kept open. On the other hand, if the Fn break code is set ON, the window which is open is closed and then the timer process is completed. Thus, the pop-up window is always displayed in a period in which the hot key is kept depressed, but the CPU 11 can be prevented from being exclusively used by the timer process in the above period. Therefore, there occurs no problem that the communication program is continuously interrupted for a long period of time.

Further, in this embodiment, the Fn status code of the Fn status register 27 is saved into the SMRAM 131 to determine the item which is displayed in a reversed form by the Fn status code of the SMRAM 131, but this is effected to prevent the display content of the pop-up window from being changed when a key different from a to-be-changed item is depressed during the display of the pop-up window.

Further, the saving destination of the Fn status code is not limited to the SMRAM 131, and may be set to a memory area, for example, the CMOS memory 251 which is not rewritten by the application program or the like.

The present power supply status is also displayed in the pop-up window according to the power supply status data of the CMOS memory 251, but rewriting of the power supply status data of the CMOS memory 251 can be effected by use of SMI.

That is, the power supply controller 23 monitors the power supply status such as the remaining battery capacity, and when the value thereof is changed, the changed power supply status is set into the communication register of the system controller 18. An SMI generation circuit is provided in the system controller 18 and an SMI signal is generated from the SMI generation circuit and supplied to the CPU 11 when the power supply status is set into the communication register. In the SMI service routine, when it is detected that the cause of generation of the SMI is issuance of the power supply status from the power supply controller 23, the power supply status of the communication register is stored into the CMOS memory 251 to rewrite the power supply status of the CMOS memory.

The newest power supply status data can be always held in the CMOS memory 251 by effecting the communication between the power supply controller 23 and the CPU 11. Therefore, it becomes possible to efficiently display the present power supply status together with the present operation mode in the window by the pop-up processing routine.

As described above, according to this invention, it becomes possible to indicate the system operation environment or configuration such as the operation mode changed by the hot key function by use of window display to the user without providing a display lamp or display unit exclusively used for status display on the computer body. Further, since the hot key function is realized by the system management interrupt and the window display function is realized by the timer interrupt, changing of the operation environment and the window display can be efficiently effected without giving any influence on the application program even if an application program such as a communication program which requires the real-time process is being executed.

Next, the processing for communicating between the CPU 11 and the power supply controller 23 by using SMI is experienced with reference to FIGS. 9 to 13. The FIG. 9 shows the hardware structure associated with the communication between the CPU 11 and the PSC 23.

FIG. 10 shows an example of the storage format of the power supply statuses in the CMOS memory.

The power supply status sent from the power supply controller 23 is stored in the storage location (index) in the CMOS memory which corresponds to the type of that power supply status. More specifically, 8-bit power source status data 1 is stored at index 70 in the CMOS memory, and 8-bit power supply status data 2 is stored at index 71.

Bit 0 of the power supply status data 1 is used to store the status received from the power supply controller 23, which indicates that the battery 2 is in a low battery state (Received Low Battery Power Off (LBI)).

Likewise, bit 1 is used to store the status received from the power supply controller 23, which indicates that the main power switch 42 is turned off (Received Main SW Power Off), bit 2 is used to store the status received from the power supply controller 23, which indicates that a power off request has been issued due to the closing of the display panel (Received Panel Close Power Off), bit 3 is used to store the status indicating that an acknowledgement ACK to a power-off sequence start command has been returned from the power supply controller 23 (Received Ack to CMD (91)), and bit 7 is used to store the status indicating that an acknowledgement ACK to other commands has been returned from the power supply controller 23 (Received ACK).

Bit 0 of the power supply status data 2 is used to store the status received from the power supply controller 23, which indicates that the AC adapter 44 has been attached (AC Adapter), bit 1 is used to store the status received from the power supply controller 23, which indicates that the first battery is in a first low battery state (1st Low Battery LB0), and bit 2 is used to store the status received from the power supply controller 23, which indicates that the first battery is in a second low battery state (2nd Low Battery LB0).

The first and second low battery statuses indicate how low the remaining battery capacity is.

The status received from the power supply controller 23, which indicates the capacity of the first battery (1st Battery Capacity), is stored at index 72 in the CMOS memory, the status received from the power supply controller 23, which indicates the remaining time of the first battery (1st Battery Time Value), is stored at index 73, the status received from the power supply controller 23, which indicates the capacity of the second battery (2nd Battery Capacity), is stored at index 74, and the status received from the power supply controller 23, which indicates the remaining time of the second battery (2nd Battery Time Value), is stored at index 75.

The types of commands exchanged between the CPU 11 and the power supply controller 23 will now be discussed.

Commands sent to the power supply controller 23 from the CPU 11 are generated by the system BIOS and the operating system, which are executed by the CPU 11. Various kinds of commands as presented below are issued to set the mode of the power supply controller 23 and instruct the operation.

| (Command) | (Contents of Commands) |
|---|---|
| 40 | Read SW status |
| 41 | Read Version (upper level) of PS microcomputer |
| 42 | Read Version (middle level) of PS microcomputer |
| 43 | Read Version (lower level) of PS microcomputer |
| 80 | Read PS status |

-continued

| (Command) | (Contents of Commands) |
|---|---|
| 91 | Start power-off sequence (start the same operation as done when power switch is depressed) |
| 9F | Power off (power off immediately) |
| A0 | Enable power switch |
| A1 | Enable auto power-off alarm |
| A2 | Disable auto power-off alarm |
| A5 | Enable power off by panel closing |
| A6 | Disable power off by panel closing |
| AC | Extend wait time for power-off command to 30 sec |
| B* | Panel back-light control |
| C0 | Read remaining battery (1st battery) capacity (upper level) |
| C1 | Read remaining battery (1st battery) capacity (lower level) |
| C2 | Read computed remaining battery (1st battery) time value |
| C8 | Read remaining battery (2nd battery) capacity (upper level) |
| C9 | Read remaining battery (2nd battery) capacity (lower level) |
| CA | Read computed remaining battery (2nd battery) time value |
| D* | Set battery capacity |
| E* | Set current coefficient in backup mode |
| F0 | Set polling mode |
| F1 | Set event mode |
| FF | ACK |

The following commands are sent to the CPU 11 from the power supply controller 23.

| (Command) | (Contents of Commands) | (Causing Commands) |
|---|---|---|
| 4* | SW status | 40 |
| 4* | Version value | 41, 42, 43 |
| 8* | PS status | 80 |
| 90 | Power off by LBI | |
| 91 | ACK of command 91 (start power-off sequence) | 91 |
| 92 | Power off request by panel closing | |
| 98 | Alter speaker volume | |
| A* | Battery capacity (upper level) | C0, C3 |
| B* | Battery capacity (lower level) | C1, C9 |
| C* | Computed remaining time (1st battery) | C2 |
| D* | Computed remaining time (2nd battery) | CA |
| FF | ACK | |

Of those commands, commands with a code of bit 7=0 are not event data, so that no SMI is generated even in event mode. Commands with a code of bit 7=1, i.e., commands 8* to 9*, are event data, so that in event mode, those commands are automatically issued by the power supply controller 23 and are reported to the CPU 11 through SMI.

Data other than 8* and 9* are sent to the CPU 11 from the power supply controller 23 in a polling form even in event mode.

The following describes the procedures for the CPU 11 to transfer a command to the power supply controller 23.

| Procedure 1: | Refer to the status register or the like in the system controller 12 to check if the power supply controller 23 is busy. |
|---|---|
| Procedure 2: | Send a command to the power supply controller 23. |
| Procedure 3: | Acknowledge the reception of a response from the power supply controller 23 within 25 milliseconds (10 ms for transmission + 10 ms for reception + margin). If no response is received within this time, which is timeout, retry from procedure 2. |

The response from the power supply controller 23 differs depending on the type of a command issued from the CPU 11. Unless the power supply controller 23 should provide data as in the status read, the power supply controller 23 returns an acknowledgement ACK to the CPU 11.

There are some commands, which request data from the power supply controller 23 but cause the power supply controller 23 to send actual data after returning ACK.

Figure 11:
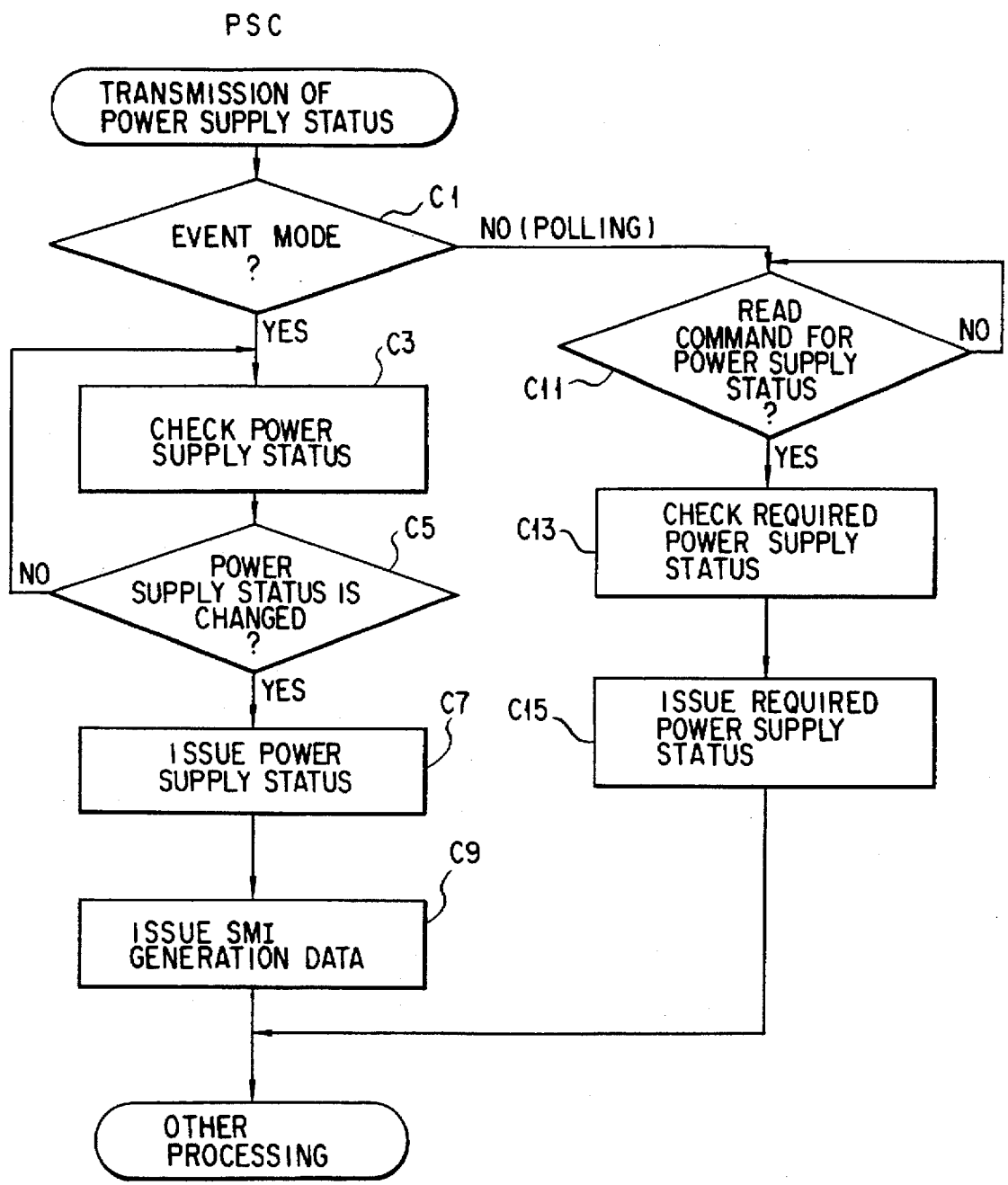
FIG. 11 is a flow chart showing the operation of the power supply controller in the personal computer in FIG. 1A.

Referring now to the flowchart in FIG. 11, a description will be given of the operational procedures of the power supply controller 23 in the case where the power supply controller 23 sends the power supply status to the CPU 11.

As described earlier, the power supply controller 23 has two operation modes, the event mode and polling mode. With the event mode set (step C1, YES), the power supply controller 23 monitors a change in power supply status, such as the presence/absence of the AC adapter 44 or the remaining battery capacity.

More specifically, the power supply controller 23 sequentially checks various power supply statuses (step C3) to determine if each power supply status has changed (step C5). When any power supply status has changed, the power supply controller 23 sets the changed power supply status in the register 191 of the I/O controller 19 (step C7) and then sets SMI generation data in the register 182 of the system controller 78 (step C9).

With the polling mode set (step C1, NO), on the other hand, when receiving a command to read a power supply status, such as the presence/absence of the AC adapter 44 or the remaining battery capacity (step C11), the power supply controller 23 checks the power supply status requested by this command (step C13) and sets the power supply status in the register 191 of the I/O controller 19 (step C18).

The power-on sequence will now be described with reference to the flowchart illustrated in FIG. 12.

Even if the system is powered off, the power supply controller 23 is still functioning. When the power switch 42 is set on under this situation, the power supply controller 23 controls the power supply circuit 40 to power on the system (step D1). At this time, the power supply controller 23 is operating in polling mode.

The system BIOS issues a command to the power source controller 23 and loads the initial value of the power supply status (step D3) from the power supply controller 23. Next, the system BIOS issues a command to set the operation of the power supply controller 23 in accordance with the setup data in the CMOS memory (steps D5 to D11), and then issues an event mode command to set the power supply controller 23 to the event mode (step D13).

As apparent from the above, the polling mode is defined as a default for the power supply controller 23, so that the power supply controller 23 operates in polling mode immediately after the system is powered on. This prevents the execution of the power-on sequence from being interrupted by the SMI from the power supply controller 23, or prevents the occurrence of malfunction due to the generation of the SMI before the system becomes ready for the SMI process.

The power-off sequence will now be described with reference to the flowchart illustrated in FIG. 13.

With the system powered on, when the power switch 42 is set off, the power supply controller 23 issues a command indicating that the power switch 42 has been set off (step E1). At this time, the event mode is automatically switched to the polling mode in response to setting off the power switch 42.

The system BIOS executes a suspend process or the like, which should be performed before power off, as needed (step E3), and then issues a power-off command to the power supply controller 23 (step E5). The power supply controller 23 controls the power supply circuit 40 to power off the system (step E7).

As described above, the power supply controller 23 automatically switches to the polling mode in response to the detection of the power switch being set off. Even if a power supply status changes during the execution of the power-off sequence, therefore, the power supply controller 23 does not generate the SMI, thus preventing the power-off sequence from being interrupted.

According to this embodiment, as described above, the power supply controller 23 monitors a change in power supply status in event mode, and upon detection of the occurrence of an event which needs power control or detection of a change in power supply status, the power supply controller 23 sets this power supply status in the register 191. At this time, the SMI is supplied to the CPU 11, informing the CPU 11 of the power supply status being set by the power supply controller 23.

According to this system, therefore, every time a change in power supply status occurs, the CPU 11 is informed of the changed power supply status by the SMI. Unlike the conventional polling type communication, therefore, the CPU 11 need not issue a command to the power supply controller 23.

It is thus possible to efficiently transfer the power supply status to the CPU 11 from the power supply controller 23.

As the power supply status sent from the power supply controller 23 is stored in the CMOS memory, the CPU 11 can acquire the latest power supply status any time as needed.

This embodiment can therefore efficiently prevent the occurrence of unnecessary communication as compared with the prior art which requires a command transfer from the CPU 11 to the power supply controller 23 even if no power supply status has changed.

As the SMI is used as an interrupt signal to the CPU 11, the power supply status can efficiently be sent to the CPU 11 from the power supply controller 23 without affecting an application program that is currently running.

Further, the power supply controller 23 has two operation modes, namely the event mode and the same polling mode as used in the prior art, and those operation modes can be changed in a programmable manner. When the CPU 11 is executing an uninterruptable program, such as an application program involving fast communication, therefore, the mode of the power supply controller 23 can be switched to the polling mode from the event mode, thus overcoming the problem, such as the occurrence of a timeout error in the application program due to an interrupt from the power supply controller 23.

In the foregoing description of this embodiment has been given with reference to the case where the CPU 11, which has received the power supply status using the SMI, stores this power supply status in the CMOS memory. Instead of the CPU 11 saving the power supply status in the CMOS memory through the SMI process, hardware, which automatically saves the power supply status in an exclusive register that is readable by the CPU 11 upon reception of such power supply status in event mode, may be provided in the system controller 18 or the I/O controller 19 so that the CPU 11 reads accesses this exclusive register to read the power supply status.

In this case, exclusive registers equivalent to the indexes 70 and 71 in the CMOS memory in FIG. 10 should be provided in the system controller 18 or the I/O controller 19.

If the power supply controller 23 is designed so that the power supply controller 23 itself selects and designates registers to set power supply statuses in accordance with the types of the power supply statuses, any power supply status can be set to the corresponding register by providing only an address decoder for decoding the address from the power supply controller 23 and selecting the proper register according to the decoding result, without providing exclusive hardware.

The use of such a system allows the CPU 11 to receive the power supply status from the power supply controller 23 without interrupting the processing in the CPU 11 even when an application program that involves fast communication is currently running.

Further, the generation of the SMI is not limited to the scheme of this embodiment which generates SMI in the power supply controller 23, but may be accomplished by other ways.

According to this invention, as described above, every time a change in power supply status occurs, the CPU is informed of the changed power supply status by an interrupt signal. Unlike the conventional polling type communication, therefore, the CPU need not issue a command to the power supply controller. It is thus possible to efficiently transfer the power supply status to the CPU from the power supply controller. As the SMI is used as an interrupt signal to the CPU, the CPU can efficiently receive the power supply status from the power supply controller without affecting an application program that is currently running.

Furthermore, immediately after the system is powered on or immediately before the system is powered off, the power supply controller operates in polling mode, thus preventing the power on sequence or the power off sequence from being interrupted by an interrupt from the power supply controller.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for modifying system configuration data of a system, comprising:

means for receiving input signals from an input device;

means for generating key codes, in response to input signals received at the receiving means;

means for generating an interrupt signal for managing the system, in response to predetermined key codes;

holding means for holding a first key code of the predetermined key codes in response to generating of the predetermined key codes;

means for executing a system configuration modification program to modify the system configuration data in response to the interrupt signal; and means for periodically generating a timer interrupt signal, wherein the system configuration modification program comprises:

means for toggling the system configuration data in response to generating a second key code of the predetermined key codes while the first key code is held by the holding means;

means for opening a display window displaying current system configuration data of the system in accordance with the second key code in response to the timer interrupt signal; and means for closing the display window.

2. The apparatus according to claim 1, further comprising means for suspending a program being executed by the system when the system management interrupt signal is generated.

3. The apparatus according to claim 1, further comprising means for resuming execution of the suspended program, after execution of the system configuration modification process.

4. The apparatus according to claim 1, wherein the key codes comprise make codes.

5. The apparatus according to claim 1, wherein the key codes comprise break codes.

6. The apparatus according to claim 1, wherein the means for receiving input signals comprises means for receiving input signals corresponding to the depression of a combination of keys.

7. The apparatus according to claim 1, wherein the system configuration data includes a plurality of modes for indicating a system configuration, the display window indicates one of the plurality of modes, the second key code selectively indicates one of function key codes, and the window opening means changes one of the plurality of modes which is indicated by the opened display window to another modes of the plurality of modes in accordance with a function key code indicated by the second key code.

8. The apparatus according to claim 7, wherein the plurality of keys includes a Fn key and function keys, the first key code corresponds to the Fn key, and the second key code selectively corresponds to one of the function keys.

9. The apparatus according to claim 7, wherein said system has two operation functions including a resume function and a boot function as the mode at the time of turn-ON of a power supply of the system.

10. The apparatus according to claim 7, wherein said system has a plurality of power save functions of different power consumptions as the mode.

11. The apparatus according to claim 7, further comprises a non-volatile memory for storing the system configuration data.

12. A method of modifying system configuration data of a system, comprising the steps of:

receiving input signals from an input device;

generating key codes, in response to the received input signals;

generating an interrupt signal for managing the system, in response to predetermined key codes;

holding a first key code of the predetermined key codes in response to generating the predetermined key codes;

executing a system configuration modification program to modify the system configuration data, in response to the interrupt signal; and periodically generating a timer interrupt signal, wherein the step of executing a system configuration modification program comprises the substeps of:

toggling the system configuration data in response to generating a second key code of the predetermined key codes while the first key code is held;

opening a display window displaying current system configuration data of the system in accordance with the second key code in response to the timer interrupt signal; and closing the display window.

13. The method according to claim 12, further comprising the step of suspending a program being executed by the system when the system management interrupt signal is generated.

14. The method according to claim 12, further comprising the step of resuming execution of the suspended program, after execution of the system configuration modification process.

15. The method according to claim 12, wherein the key codes comprise make codes.

16. The method according to claim 12, wherein the key codes comprise break codes.

17. The method according to claim 12, wherein the step of receiving input signals comprises the substep of receiving input signals corresponding to the depression of a combination of keys.

18. A computer program product for processing data, comprising:

a computer usable medium having computer readable program code means embodied in said medium for modifying system configuration data, the computer program product having;

computer readable program code means for causing the computer to receive input signals from an input device of the computer;

computer readable program code means for causing the computer to generate key codes, in response to the received input signals;

computer readable program code means for causing the computer to generate an interrupt signal for managing the system, in response to predetermined key codes;

computer readable program code means for causing the computer to hold a first key code of the predetermined key codes in response to generating the predetermined key codes;

computer readable program code means for causing the computer to modify the system configuration data, in response to the interrupt signal; and computer readable program code means for causing the computer to generate a timer interrupt signal periodically, wherein the computer readable program code means for causing the computer to modify the system configuration data comprises:

computer readable program code means for causing the computer to toggle the system configuration data in response to generating of a second key code of the predetermined key codes while the first key code is held;

computer readable program code means for causing the computer to open a display window displaying current system configuration data of the system in accordance with the second key in response to the timer interrupt signal; and computer readable program code means for causing the computer to close the display window.

19. The article of manufacture according to claim 18, further comprising means for causing a processor to suspend execution of a program when the system management interrupt signal is generated.

20. The article of manufacture according to claim 18, further comprising means for causing a processor to resume execution of the suspended program, after execution of the system configuration modification process.

21. The article of manufacture according to claim 18, wherein the key codes comprise make codes.

22. The article of manufacture according to claim 18, wherein the key codes comprise break codes.

23. The article of manufacture according to claim 18, wherein the means for causing a processor to receive input signals comprises means for causing a processor to receive input signals corresponding to the depression of a combination of keys.

24. The apparatus according to claim 7, wherein:

the input device includes a plurality of keys, the key codes generating means generates a break code indicating release of a key of the plurality of keys which corresponds to the first key code, and the closing means closes the display window in response to the break code so that the system configuration modification program is terminated.

* * * * *